(12) United States Patent
Takagi

(10) Patent No.: US 12,140,851 B2
(45) Date of Patent: *Nov. 12, 2024

(54) IMAGING APPARATUS

(71) Applicant: FUJIFILM Corporation, Tokyo (JP)

(72) Inventor: Masaaki Takagi, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/320,699

(22) Filed: May 19, 2023

(65) Prior Publication Data

US 2023/0288780 A1  Sep. 14, 2023

Related U.S. Application Data

(63) Continuation of application No. 17/690,843, filed on Mar. 9, 2022, now Pat. No. 11,693,294, which is a
(Continued)

(30) Foreign Application Priority Data

Sep. 30, 2015 (JP) .................................. 2015-194236

(51) Int. Cl.
*G03B 13/02* (2021.01)
*G03B 17/04* (2021.01)
(Continued)

(52) U.S. Cl.
CPC ............. *G03B 13/02* (2013.01); *G03B 17/04* (2013.01); *H04N 23/51* (2023.01); *H04N 23/531* (2023.01)

(58) Field of Classification Search
None
See application file for complete search history.

(56) References Cited

U.S. PATENT DOCUMENTS 9,781,314 B2    10/2017   Inaba
10,838,283 B2 *   11/2020   Takagi .................. G03B 17/04
(Continued)

FOREIGN PATENT DOCUMENTS

CN        1612681 A     5/2005
CN     101317123 A    12/2008
(Continued)

OTHER PUBLICATIONS

Advisory Action issued Nov. 18, 2019 in corresponding U.S. Appl. No. 15/924,815.
(Continued)

*Primary Examiner* — Rodney E Fuller
(74) *Attorney, Agent, or Firm* — Birch, Stewart, Kolasch & Birch, LLP

(57) ABSTRACT

An imaging apparatus includes: a main body having an imaging element; a rectangular display disposed along one surface of the main body; and a hinge unit that movably connects the display to the main body, the hinge unit includes a support portion connected to the main body so as to be rotationally movable about a first axis by a pair of first hinges on the first axis extending along one of two sides of the display which are at right angles to each other, the display is supported by the support portion so as to be rotationally movable about a second axis by a pair of second hinges on the second axis extending along other of the two sides of the display which are at right angles to each other, and one of the pair of first hinges is disposed between the pair of second hinges.

20 Claims, 32 Drawing Sheets

Related U.S. Application Data continuation of application No. 17/038,275, filed on Sep. 30, 2020, now Pat. No. 11,320,721, which is a continuation of application No. 15/924,815, filed on Mar. 19, 2018, now Pat. No. 10,838,283, which is a continuation of application No. PCT/JP2016/068553, filed on Jun. 22, 2016.

(51) Int. Cl.
    *H04N 23/51*     (2023.01)
    *H04N 23/53*     (2023.01)

(56) References Cited

U.S. PATENT DOCUMENTS

| | | |
|---|---|---|
| 2004/0000031 A1 | 1/2004 | Hsu |
| 2005/0046728 A1 | 3/2005 | Hojo et al. |
| 2005/0087666 A1 | 4/2005 | Hwang |
| 2007/0242150 A1 | 10/2007 | Terada |
| 2008/0026801 A1 | 1/2008 | Bliss |
| 2009/0135328 A1 | 5/2009 | Serizawa et al. |
| 2010/0041439 A1 | 2/2010 | Bullister |
| 2010/0077566 A1 | 4/2010 | Nishizawa et al. |
| 2011/0063809 A1 | 3/2011 | Hoshino |
| 2012/0113308 A1 | 5/2012 | Ishikawa |
| 2012/0111597 A1 | 6/2012 | Korcz et al. |
| 2014/0043504 A1 | 2/2014 | Ito et al. |
| 2014/0253777 A1 | 9/2014 | Yamaura et al. |
| 2015/0334273 A1 | 11/2015 | Yanagisawa |
| 2015/0358512 A1 | 12/2015 | Mitsui |
| 2016/0060933 A1 | 3/2016 | Iwasaki |
| 2017/0006194 A1 | 1/2017 | Inaba |
| 2018/0210315 A1 | 7/2018 | Takagi |
| 2021/0011355 A1 | 1/2021 | Takagi |
| 2022/0197112 A1 | 6/2022 | Takagi |
| 2023/0288780 A1 | 9/2023 | Takagi |

FOREIGN PATENT DOCUMENTS

| | | |
|---|---|---|
| CN | 101493633 A | 7/2009 |
| JP | 2000-50117 A | 2/2000 |
| JP | 2001-65540 A | 3/2001 |
| JP | 2001-94845 A | 4/2001 |
| JP | 2005-79732 A | 3/2005 |
| JP | 4346744 B2 | 10/2009 |
| JP | 2013-025617 A | 2/2013 |
| JP | 2013-137367 A | 7/2013 |
| JP | 5296270 B1 | 9/2013 |
| JP | 2013-207389 A | 10/2013 |
| JP | 2013-214931 A | 10/2013 |
| JP | 2014-11721 A | 1/2014 |
| JP | 2015-106757 A | 4/2014 |
| JP | 5461738 B1 | 4/2014 |
| JP | 2014-187675 A | 10/2014 |
| JP | 2014-215342 A | 11/2014 |
| JP | 2015-56706 A | 3/2015 |
| JP | 2015-88945 A | 5/2015 |
| JP | 5749842 B2 | 7/2015 |
| JP | 2015-143769 A | 8/2015 |
| JP | 6006024 B2 | 10/2016 |
| JP | 6021512 B2 | 11/2016 |
| JP | 6244501 B2 | 12/2017 |
| TW | 201434313 A | 9/2014 |
| TW | 201528811 A | 7/2015 |
| WO | WO 2017/056590 A1 | 4/2017 |

OTHER PUBLICATIONS

Chinese Office Action and Search Report for corresponding Chinese Application No. 201680056831.8, dated Oct. 8, 2019, with English translation.
Chinese Office Action and Search Report, dated Jun. 9, 2020, for corresponding Chinese Application No. 201680056831.8, with an English translation.
International Preliminary Report on Patentability and Written Opinion of the International Searching Authority (Forms PCT/IB/326, PCT/IB/373 and PCT/ISA/237) for Application No. PCT/JP2016/068553, dated Apr. 12, 2018, with an English translation.
International Search Report and English translation (Form PCT/ISA/210) for Application No. PCT/JP2016/068553, dated Aug. 9, 2016.
Notice of Allowance issued Aug. 26, 2020 in corresponding U.S. Appl. No. 15/924,815.
Notice of Allowance issued Dec. 10, 2021 in U.S. Appl. No. 17/038,275.
Notice of Allowance issued Feb. 21, 2023 in corresponding U.S. Appl. No. 17/690,843.
Notice of Allowance issued Jul. 6, 2020 in corresponding U.S. Appl. No. 15/924,815.
Notice of Submission of Publications for corresponding Japanese Patent Application No. 2017-542935, dated Jan. 11, 2022, with English translation.
Office Action issued for corresponding German Application No. 11 2016 004 031.8, dated Jan. 11, 2022, with partial English translation.
Office Action issued Jan. 2, 2019 in corresponding U.S. Appl. No. 15/924,815.
Office Action issued Jul. 26, 2019 in corresponding U.S. Appl. No. 15/924,815.
Office Action issued Jul. 27, 2021 in U.S. Appl. No. 17/038,275.
Office Action issued Oct. 25, 2022 in corresponding U.S. Appl. No. 17/690,843.
Supplemental Notice of Allowance issued Feb. 25, 2022 in U.S. Appl. No. 17/038,275.
Supplemental Notice of Allowance issued Mar. 1, 2023 in corresponding U.S. Appl. No. 17/690,843.
Japanese Written Statement for corresponding Japanese Application No. 2017-542935, dated Mar. 5, 2023, with English translation.
Japanese Trial and Appeal Decision for corresponding Japanese Application No. 2017-542935, dated Sep. 22, 2023, with English translation.

\* cited by examiner

IMAGING APPARATUS

CROSS REFERENCE TO RELATED APPLICATION

This application is a Continuation of U.S. application Ser. No. 17/690,843 filed on Mar. 9, 2022, which is a Continuation of U.S. application Ser. No. 17/038,275 filed on Sep. 30, 2020 (now U.S. Pat. No. 11,320,721 issued on May 3, 2022), which is a Continuation of U.S. application Ser. No. 15/924,815 filed on Mar. 19, 2018 (now U.S. Pat. No. 10,838,283 issued on Nov. 17, 2020), which is a Continuation of International Application No. PCT/JP2016/068553 filed on Jun. 22, 2016, and claims priority under 35 U.S.C. § 119(a) to Japanese Patent Application No. 2015-194236 filed on Sep. 30, 2015, the entire disclosures of which are incorporated herein by reference in their entirety.

BACKGROUND OF THE INVENTION

1. Field of the Invention

The present invention relates to an imaging apparatus.

2. Description of the Related Art

As imaging apparatuses in which a live view image is displayed on a display disposed along one surface of a main body having an imaging element, there are known imaging apparatuses which are provided with a movable display, and are configured to be capable of imaging at various imaging angles of a high angle and a low angle without changing an imaging posture.

As shown in FIGS. 31, 32A and 32B, a digital camera disclosed in JP5461738B includes a hinge unit 3 that movably connects a display 2 disposed along one surface of a main body 1 to the main body 1.

The hinge unit 3 is connected to the main body 1 so as to be rotationally movable about an axis A by a pair of first hinges 4 having a shaft member, not shown, inserted into a bearing hole 4a which is provided to each of the main body 1 and the hinge unit 3. The display 2 is supported by the hinge unit 3 so as to be rotationally movable about an axis B which is at right angles to the axis A by a pair of second hinges 5 having a shaft portion 5b, provided to the display 2, inserted into a bearing hole 5a provided in the hinge unit 3.

For example, the display 2 is rotationally moved about the axis A integrally with the hinge unit 3 in a horizontal structure in which an imaging range extends in a relatively horizontal direction, and the display 2 is independently rotationally moved about the axis B in a vertical structure in which an imaging range extends in a relatively vertical direction. In the case of both the horizontal structure and the vertical structure, the angle of the display 2 can be changed in accordance with an imaging angle.

SUMMARY OF THE INVENTION

In the hinge unit 3 of the digital camera disclosed in JP5461738B, the axis A along which the pair of first hinges 4 are disposed intersects the axis B along the pair of second hinges 5 are provided, at the outer side of the pair of second hinges 5, the pair of first hinges 4 on the axis A are disposed so as to protrude to the outer side of the display 2, and the hinge unit 3 is configured to be larger than the display 2. In a case where a mechanism such as the pair of first hinges 4 is disposed so as to protrude to the outer side of the display 2 and is exposed to the outward appearance of the digital camera, the design of the digital camera is damaged.

The present invention is contrived in view of such circumstances, and an object thereof is to provide an imaging apparatus capable of reducing the size of a hinge unit that movably connects a display to a main body.

According to an aspect the present invention, there is provided an imaging apparatus comprising: a main body having an imaging element; a rectangular display disposed along one surface of the main body; and a hinge unit that movably connects the display to the main body; wherein the hinge unit includes a support portion connected to the main body so as to be rotationally movable about a first axis by a pair of first hinges on the first axis extending along one of two sides of the display which are at right angles to each other, the display is supported by the support portion so as to be rotationally movable about a second axis by a pair of second hinges on the second axis extending along the other of the two sides of the display which are at right angles to each other, and one of the pair of first hinges is disposed between the pair of second hinges.

In addition, according to another aspect of the present invention, there is provided an imaging apparatus comprising: a main body having an imaging element; a rectangular display disposed along one surface of the main body; and a hinge unit that movably connects the display to the main body; wherein the hinge unit includes a first support portion connected to the main body so as to be rotationally movable about a first axis by a pair of first hinges on the first axis extending along one of two sides of the display which are at right angles to each other, and a second support portion connected to the first support portion so as to be rotationally movable about a second axis parallel to the first axis by a pair of second hinges on the second axis biased toward one side located opposite to one side of the display along which the first axis extends with respect to the first axis, the display is supported by the second support portion so as to be rotationally movable about a third axis by a pair of third hinges on the third axis extending along the other of the two sides of the display which are at right angles to each other, and at least any one of one of the pair of first hinges and one of the pair of second hinges is disposed between the pair of third hinges.

According to the present invention, it is possible to reduce the size of a hinge unit that movably connects a display to a main body.

EXPLANATION OF REFERENCES

Figure 1A:
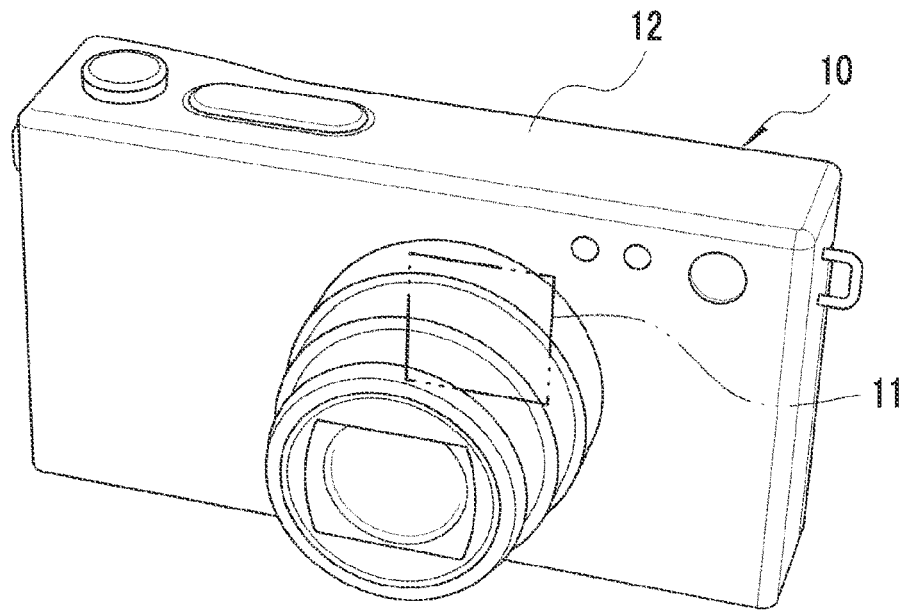
FIG. 1A is a perspective view illustrating an example of an imaging apparatus according to an embodiment of the present invention.

1: digital camera main body
2: display
3: hinge unit
4: first hinge
4a: bearing hole
5: second hinge
5a: bearing hole
5b: shaft portion
10: digital camera
11: imaging element
12: main body
13: display
13a: long side of display
13b: short side of display 13c: long side of display
13d: short side of display
14: hinge unit
15: display panel
16: cover
17: concave portion
20: fixed portion
21: support portion
23: first hinge
24: second hinge
30: hinge bracket
31: hinge bracket
32: hinge pin
33: hinge bracket
34: hinge bracket
35: hinge pin
40: first rotational movement operating portion
41: second rotational movement operating portion
50: rotational movement operating portion
51: engagement member
52: biasing member
53: protruding portion
60: magnet
61: magnet
62: magnet
70: sliding contact plate
71: convex portion
72: concave portion
73: sliding contact plate
74: convex portion
75: concave portion
80: engagement member
81: biasing member
110: digital camera
114: hinge unit
120: fixed portion
121: first support portion
122: second support portion
123: first hinge
124: second hinge
125: third hinge
130: hinge bracket
131: hinge bracket
132: hinge pin
133: hinge bracket
134: hinge bracket
135: hinge pin
136: hinge bracket
137: hinge bracket
138: hinge pin
140: first rotational movement operating portion
141: second rotational movement operating portion
142: third rotational movement operating portion
150: rotational movement operating portion
151: engagement member
152: biasing member
153: protruding portion
160: magnet
161: magnet
180: engagement member
181: biasing member
A: axis
B: axis
C: axis
E edge of cover
H1: engagement margin of convex portion and concave portion
H2: engagement margin of convex portion and concave portion
P1: locked position
P2: unlocked position
T1: thickness of sliding contact plate
T2: thickness of sliding contact plate

DETAILED DESCRIPTION OF THE INVENTION

Figure 1B:
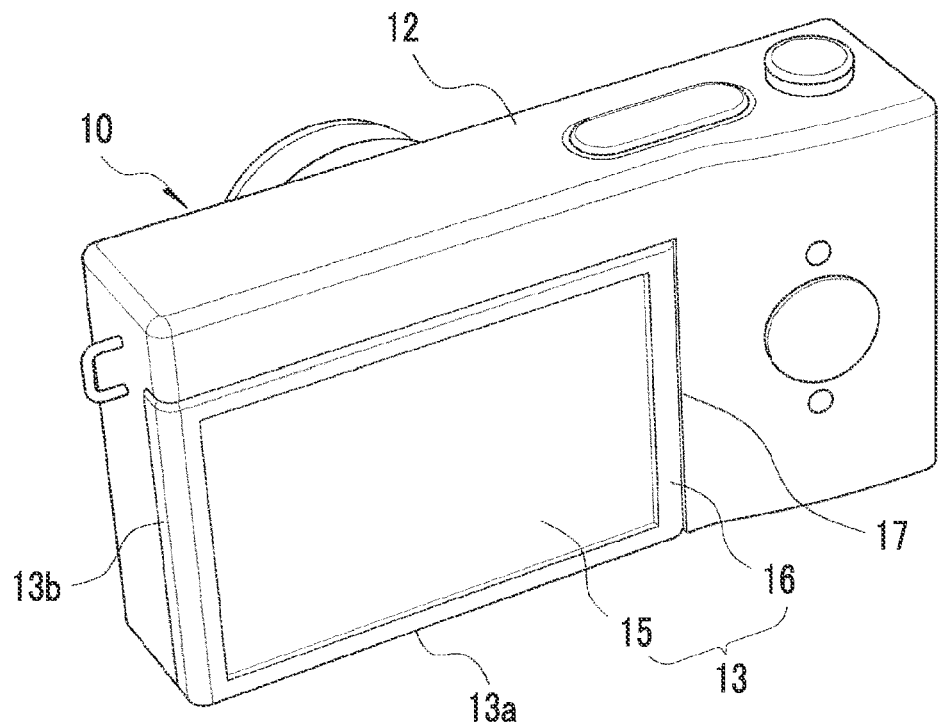
FIG. 1B is a perspective view of the rear surface side of the imaging apparatus of FIG. 1A.

FIGS. 1A and 1B are an example of an imaging apparatus according to an embodiment of the present invention.

A digital camera 10 as the imaging apparatus shown in FIGS. 1A and 1B includes a main body 12 having an imaging element 11 such as a charge coupled device (CCD) image sensor or a complementary metal oxide semiconductor (CMOS) image sensor, a display 13, and a hinge unit that movably connects the display 13 to the main body 12.

The display 13 includes a display panel 15 such as a liquid crystal or organic EL, and a cover 16 having a window for exposing the display region of the display panel 15 formed thereon, and is formed in a substantially rectangular shape when the display panel 15 is seen from the front. The rear surface of the main body 12 is provided with a concave portion 17 formed in a substantially rectangular shape similarly to the display 13, and the display 13 is received in the concave portion 17 and is disposed along the rear surface of the main body 12.

The concave portion 17 is open to the bottom of the main body 12 and one lateral side of the main body 12. The lateral side of one long side 13a and the lateral side of one short side 13b among four lateral sides of the display 13 are exposed in a state where the display 13 is received in the concave portion 17.

Figure 2A:
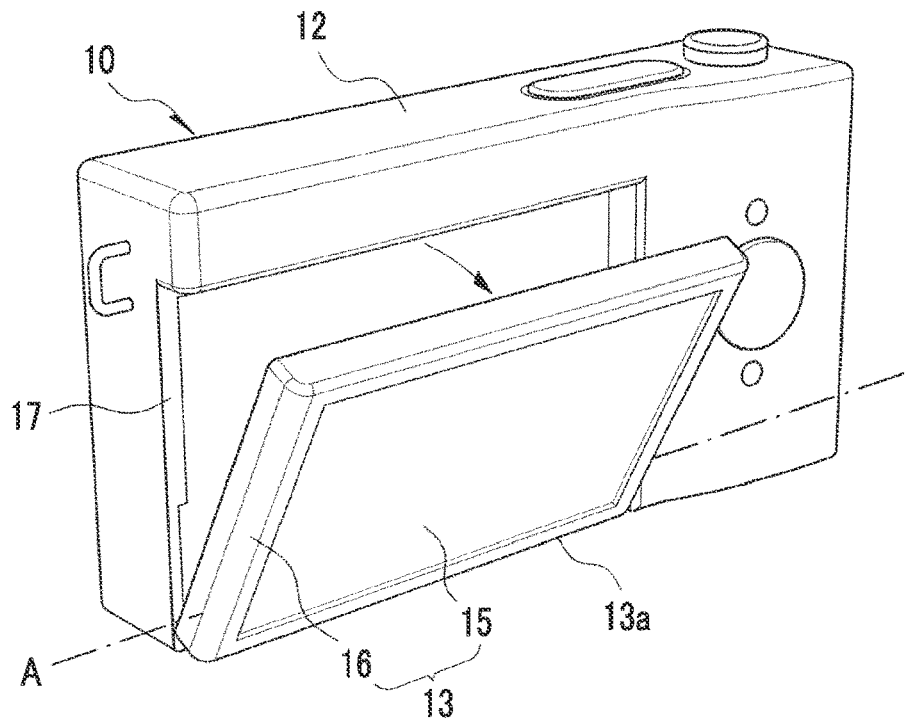
FIG. 2A is a schematic diagram illustrating an operation of a display of the imaging apparatus of FIG. 1A.
Figure 2B:
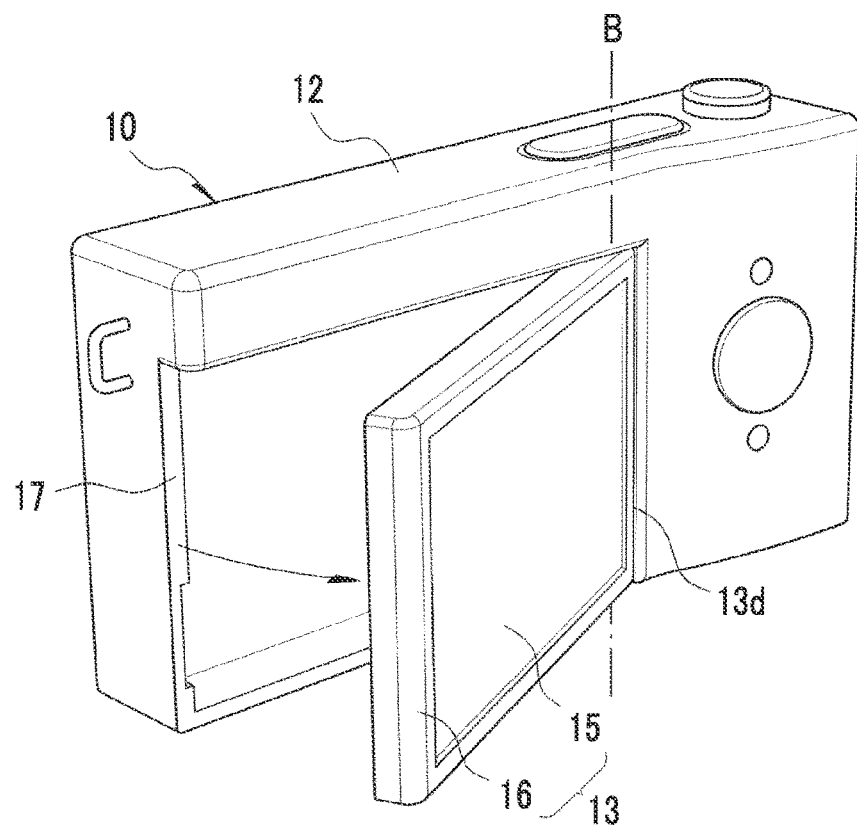
FIG. 2B is a schematic diagram illustrating an operation of the display of the imaging apparatus of FIG. 1A.

As shown in FIGS. 2A and 2B, the hinge unit of the present example connects the display 13 to the main body 12 so as to be rotationally movable about an axis A (first axis) extending along the long side 13a of the display 13, and to be rotationally movable about an axis B (second axis) which is substantially at right angles to the axis A and extends along a short side 13d of the display 13. Meanwhile, the meaning that the axis A and the axis B extend "along" the sides of the display 13 refers to the meaning that the axis A and the axis B are parallel to the sides of the display 13 without being away from the sides.

Figure 3:
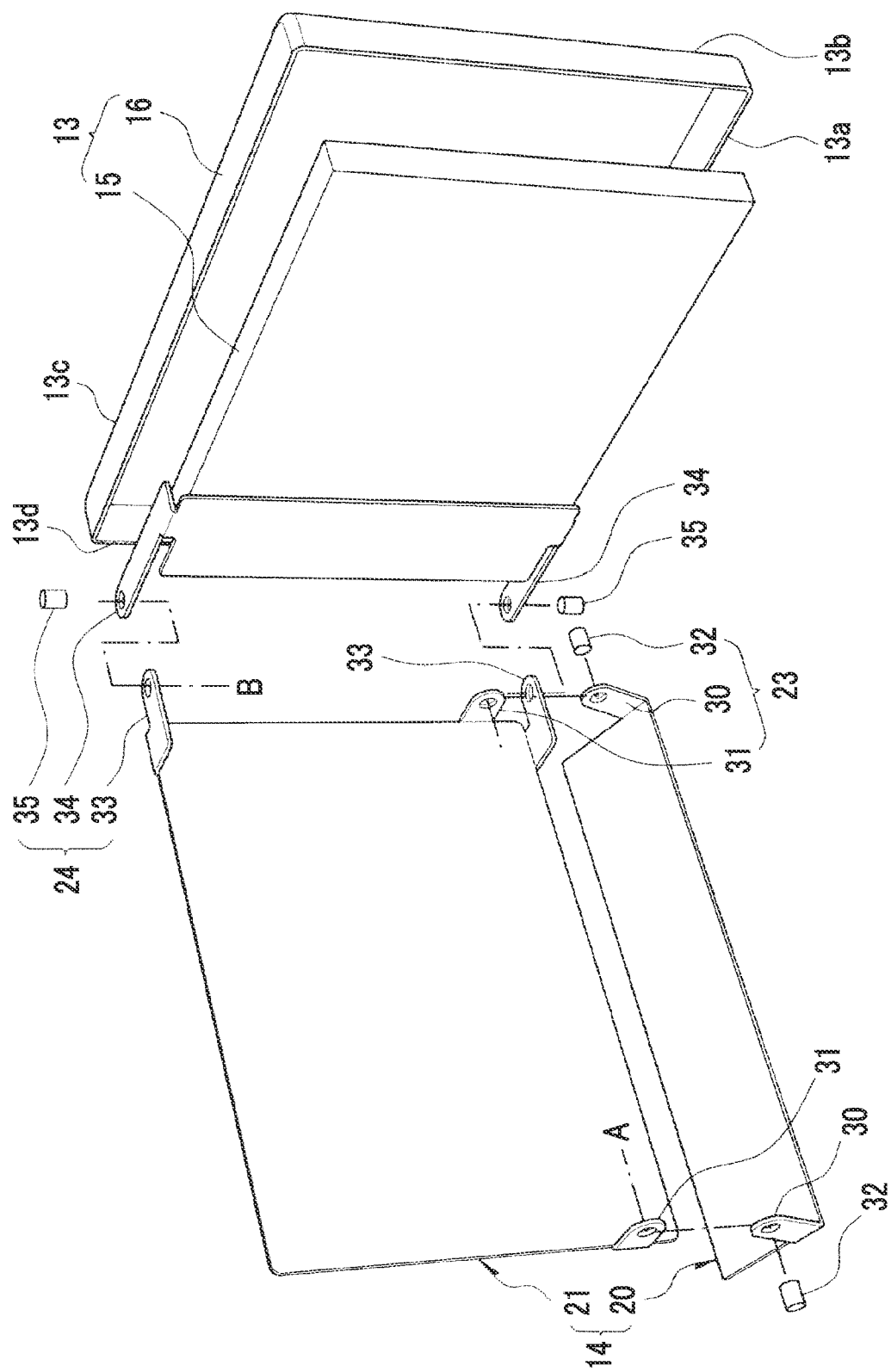
FIG. 3 is an exploded perspective view of a hinge unit of the imaging apparatus of FIG. 1A.

FIG. 3 shows a configuration of the hinge unit of the digital camera 10.

A hinge unit 14 includes a fixed portion 20 which is fixed to the bottom of the concave portion 17 of the main body 12, and a support portion 21 that supports the display 13.

The fixed portion 20 is provided with a pair of hinge brackets 30 which are disposed on the axis A, and the support portion 21 is provided with a pair of hinge brackets 31 which are superimposed on the hinge brackets 30 in the axial direction of the axis A. The hinge bracket 30 and the hinge bracket 31 superimposed on each other are coupled to each other by a hinge pin 32 so as to be rotatable relative to each other.

A first hinge 23 which is disposed on the axis A is constituted the hinge bracket 30, the hinge bracket 31 and the hinge pin 32. The support portion 21 is connected to the main body 12 through the fixed portion 20 so as to be rotationally movable about the axis A by a pair of first hinges 23 on the axis A.

The support portion 21 is provided with a pair of hinge brackets 33 which are disposed on the axis B, and the display 13 is provided with a pair of hinge brackets 34 which are superimposed on the hinge brackets 33 in the axial direction of the axis B. The hinge bracket 33 and the hinge bracket 34 superimposed on each other are coupled by a hinge pin 35 so as to be rotatable relative to each other.

A second hinge 24 which is disposed on the axis B is constituted by the hinge bracket 33, the hinge bracket 34 and the hinge pin 35. The display 13 is supported by the support portion 21 so as to be rotationally movable about the axis B by a pair of second hinges 24 on the axis B.

According to the hinge unit 14, the display 13 is rotationally moved about the axis A integrally with the support portion 21 of the hinge unit 14, and is independently rotationally moved about the axis B.

The pair of first hinges 23 on the axis A are disposed on both ends of the long side 13a of the display 13, respectively, along which the axis A extends, and have an improvement in further stability of the rotational movement of the display 13 about the axis A than in a case where the pair of first hinges 23 are disposed adjacent to each other.

Similarly, the pair of second hinges 24 on the axis B are disposed on both ends of the short side 13d of the display 13, respectively, along which the axis B extends, and have an improvement in further stability of the rotational movement of the display 13 about the axis B than in a case where the pair of second hinges 24 are disposed adjacent to each other.

In a state where the display 13 is received in the concave portion 17 and is disposed along the rear surface of the main body 12, the hinge unit 14 is covered with the cover 16 of the display 13, and is not exposed to the outward appearance of the digital camera 10. The hinge unit 14 is not exposed to the outward appearance of the digital camera 10, and thus it is possible to improve the design of the digital camera 10.

Figure 4A:
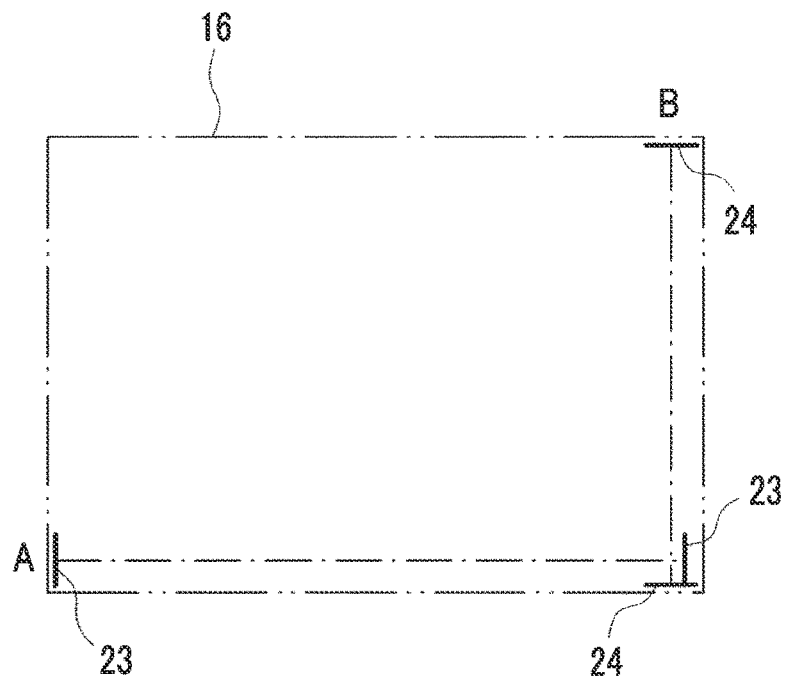
FIG. 4A is a schematic diagram illustrating disposition of a pair of first hinges and a pair of second hinges of the hinge unit of FIG. 3.
Figure 4B:
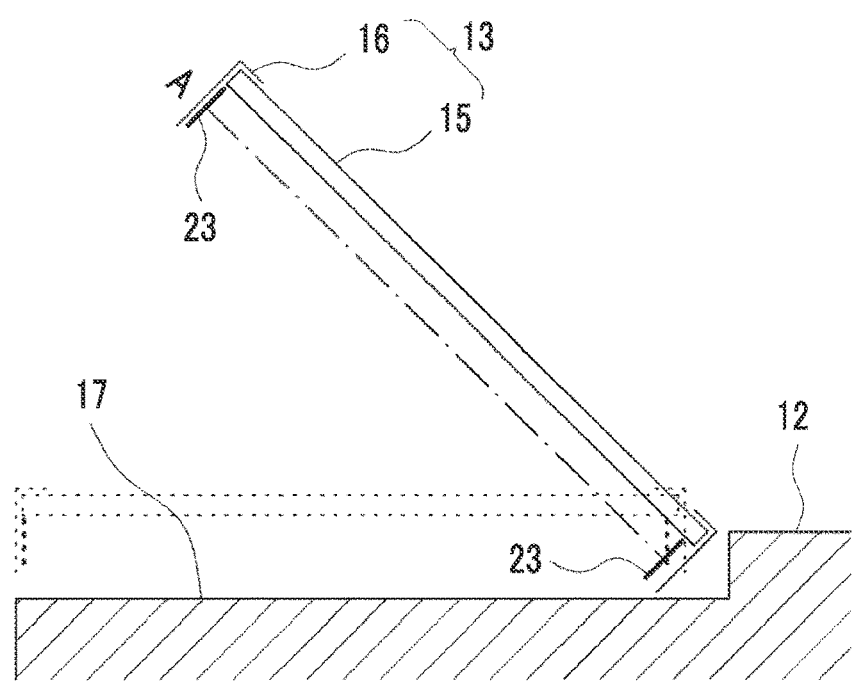
FIG. 4B is a schematic diagram illustrating a trajectory of the hinge unit of FIG. 4A when the hinge unit is rotationally moved about the axis of the pair of second hinges.

FIG. 4A schematically shows the disposition of the pair of first hinges 23 and the pair of second hinges 24 of the hinge unit 14, and FIG. 4B schematically shows a trajectory of the hinge unit 14 when the hinge unit 14 is rotationally moved about the axis B of the pair of second hinges 24.

As shown in FIGS. 4A and 4B, in the hinge unit 14 of the present example, one first hinge 23 of the pair of first hinges 23 on the axis A which is located closer to the axis B is disposed between the pair of second hinges 24 on the axis B. In the drawings, the frame of a dashed-two dotted line shows the outer circumference of the cover 16 when the display panel 15 of the display 13 is seen from the front.

FIGS. 5A, 5B, 6A, 6B, 7A and 7B show a case where the first hinge 23 located closer to the axis B is disposed away from between the pair of second hinges 24.

Figure 5A:
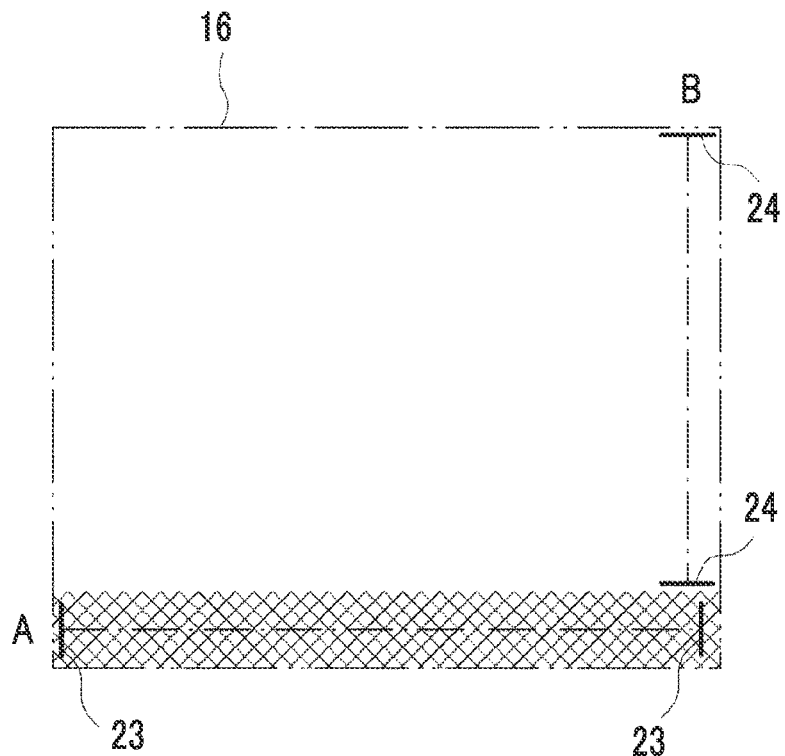
FIG. 5A is a schematic diagram illustrating a reference example of the disposition of the pair of first hinges and the pair of second hinges.
Figure 5B:
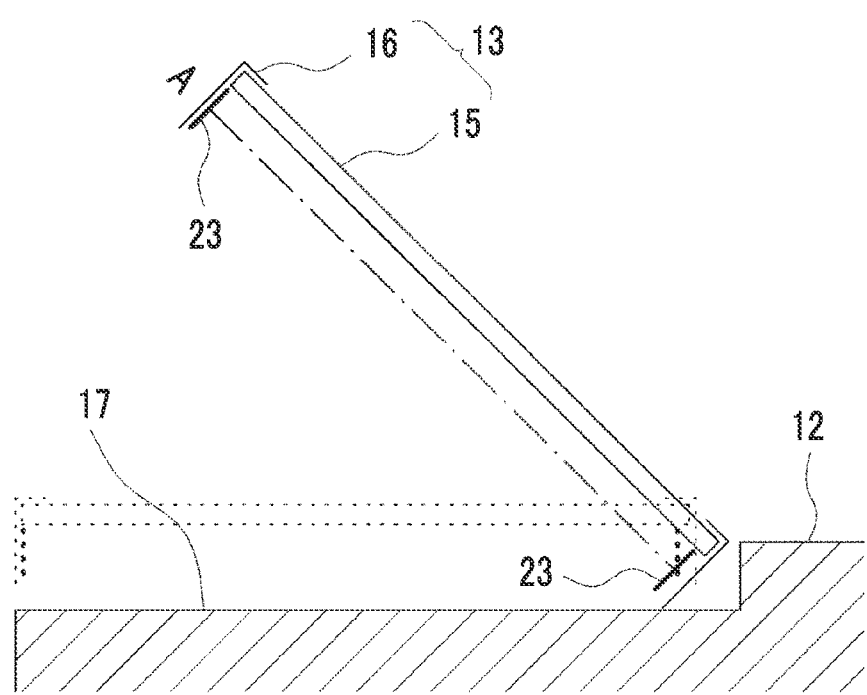
FIG. 5B is a schematic diagram illustrating a trajectory of the hinge unit of FIG. 5A when the hinge unit is rotationally moved about the axis of the pair of second hinges.

FIGS. 5A and 5B show a case where the first hinge 23 located closer to the axis B is disposed away from between the pair of second hinges 24 in the axial direction of the axis B, and the axis A and the axis B intersect each other on the outer side of the pair of second hinges 24. In this case, the outer circumferences of the hinge unit 14 and the cover 16 that covers the hinge unit 14 are extended, as cross-hatched in the drawings, in the axial direction of the axis B with respect to the outer circumferences of the hinge unit 14 and the cover 16 shown in FIGS. 4A and 4B.

Figure 6A:
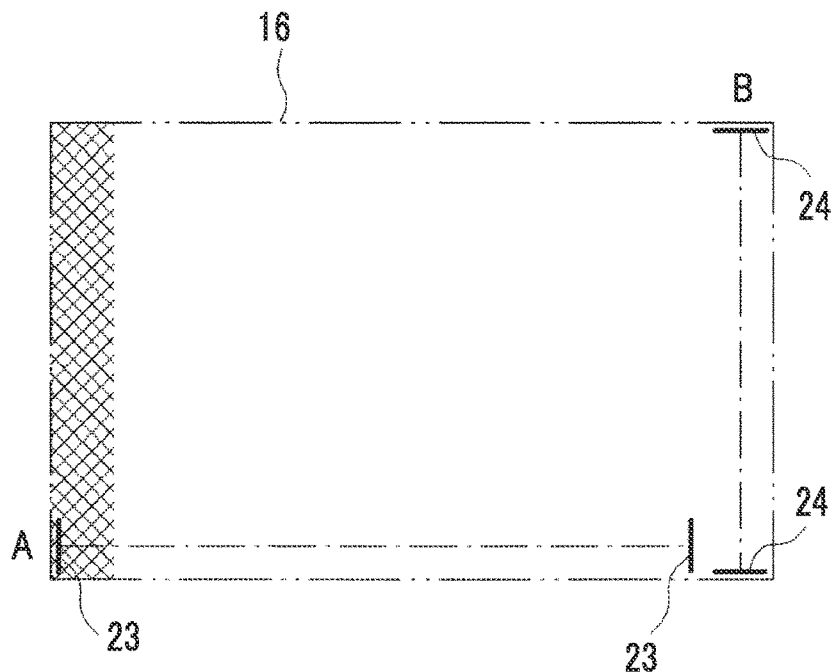
FIG. 6A is a schematic diagram illustrating another reference example of the disposition of the pair of first hinges and the pair of second hinges.
Figure 6B:
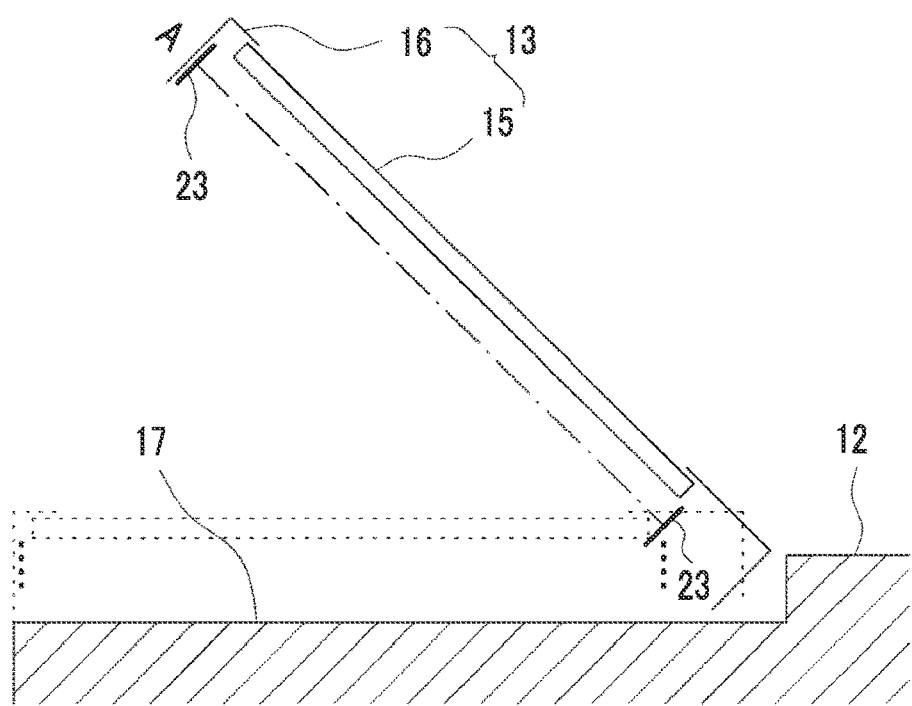
FIG. 6B is a schematic diagram illustrating a trajectory of the hinge unit of FIG. 6A when the hinge unit is rotationally moved about the axis of the pair of second hinges.

FIGS. 6A and 6B show a case where the first hinge 23 located closer to the axis B is disposed away from between the pair of second hinges 24 in the axial direction of the axis A, and the axis A and the axis B intersect each other on the outer side of the pair of first hinges 23, that is, the pair of first hinges 23 are disposed on one side of the axis B in the axial direction of the axis A. In this case, the outer circumferences of the hinge unit 14 and the cover 16 that covers the hinge unit 14 are extended, as cross-hatched in the drawings, in the axial direction of the axis A with respect to the outer circumferences of the hinge unit 14 and the cover 16 shown in FIGS. 4A and 4B.

Figure 7A:
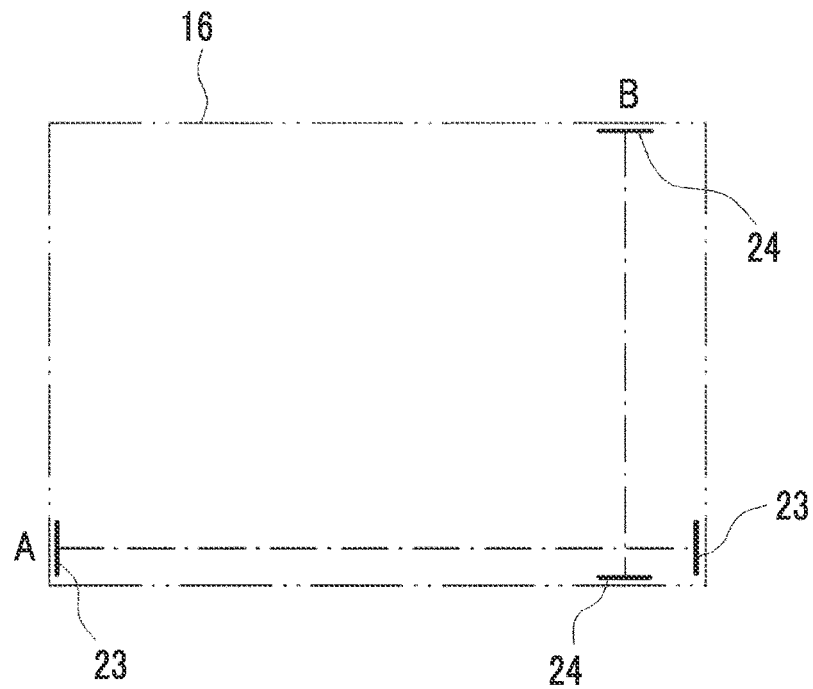
FIG. 7A is a schematic diagram illustrating another reference example of the disposition of the pair of first hinges and the pair of second hinges.
Figure 7B:
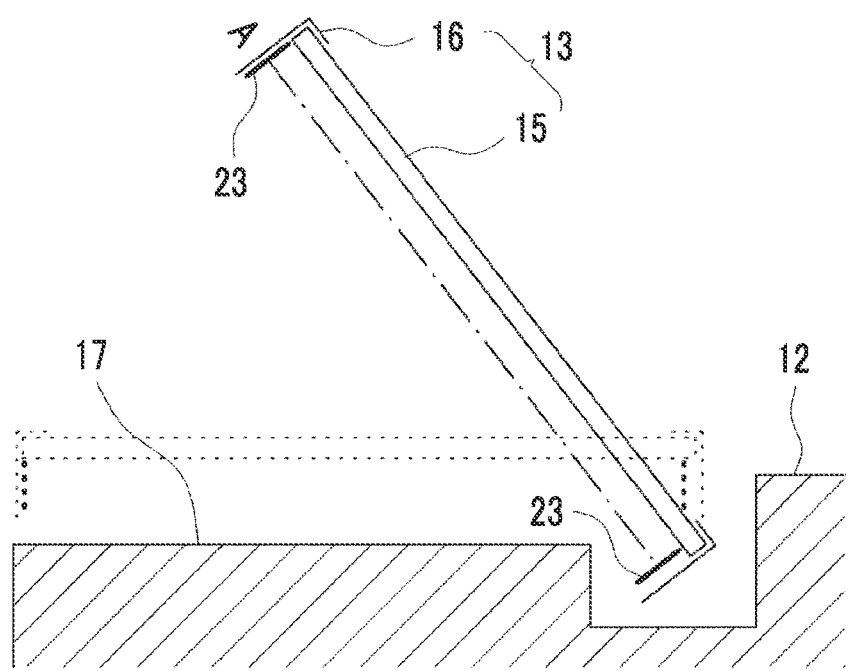
FIG. 7B is a schematic diagram illustrating a trajectory of the hinge unit of FIG. 7A when the hinge unit is rotationally moved about the axis of the pair of second hinges.

FIGS. 7A and 7B show a case where the first hinge 23 located closer to the axis B is disposed away from between the pair of second hinges 24 in the axial direction of the axis A, and the axis A and the axis B intersect each other between the pair of first hinges 23, that is, one first hinge 23 located closer to the axis B is disposed on the opposite side to the other first hinge 23 with the axis B interposed therebetween. In this case, the outer circumference of the cover 16 that covers the hinge unit 14 is equivalent to the outer circumference of the cover 16 shown in FIGS. 4A and 4B.

However, one first hinge 23 located closer to the axis B is disposed on the opposite side to the other first hinge 23 with the axis B interposed therebetween, and thus the first hinge 23 located closer to the axis B is revolved about the axis B toward the bottom of the concave portion 17 of the main body 12, in association with the rotational movement of the display 13 about the axis B. The first hinge 23 located closer to the axis B is disposed away from between the pair of second hinges 24 in the axial direction of the axis A and thus leads to an increase in revolution radius. For this reason, the bottom of the concave portion 17 of the main body 12 is required to have a clearance groove for avoiding interference with the first hinge 23.

In this manner, one first hinge 23 of the pair of first hinges 23 which is located closer to the axis B is disposed between the pair of second hinges 24, and thus it is possible to reduce the size of the hinge unit 14.

Next, description will be given of various modification examples of the digital camera 10 having an improvement in the rotational movement operability of the display 13 which is rotationally moved about the axis A integrally with the support portion 21 of the hinge unit 14 and is independently rotationally moved about the axis B.

Figure 8:
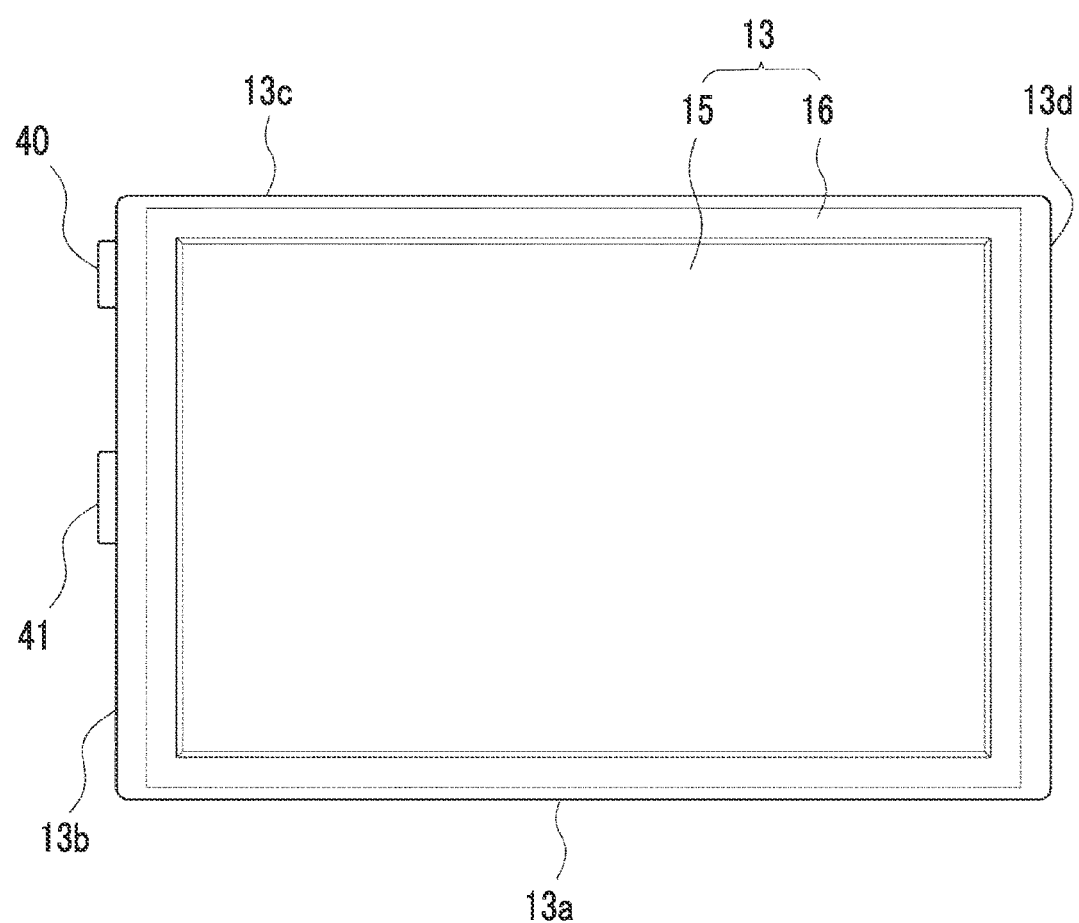
FIG. 8 is a front view of a display and a hinge unit which are modification examples of the imaging apparatus of FIG. 1A.
Figure 9A:
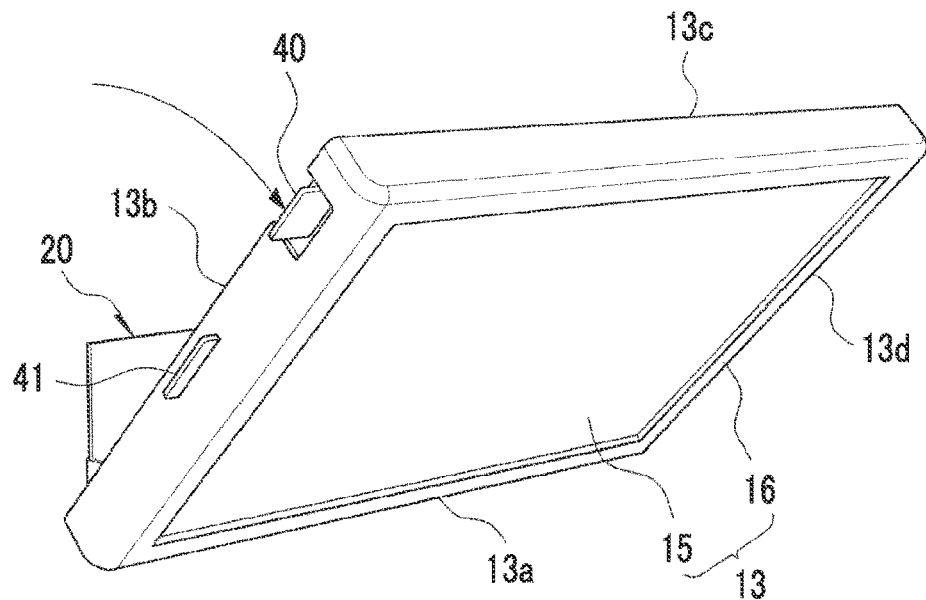
FIG. 9A is a schematic diagram illustrating an operation of the display of the imaging apparatus of FIG. 8.
Figure 9B:
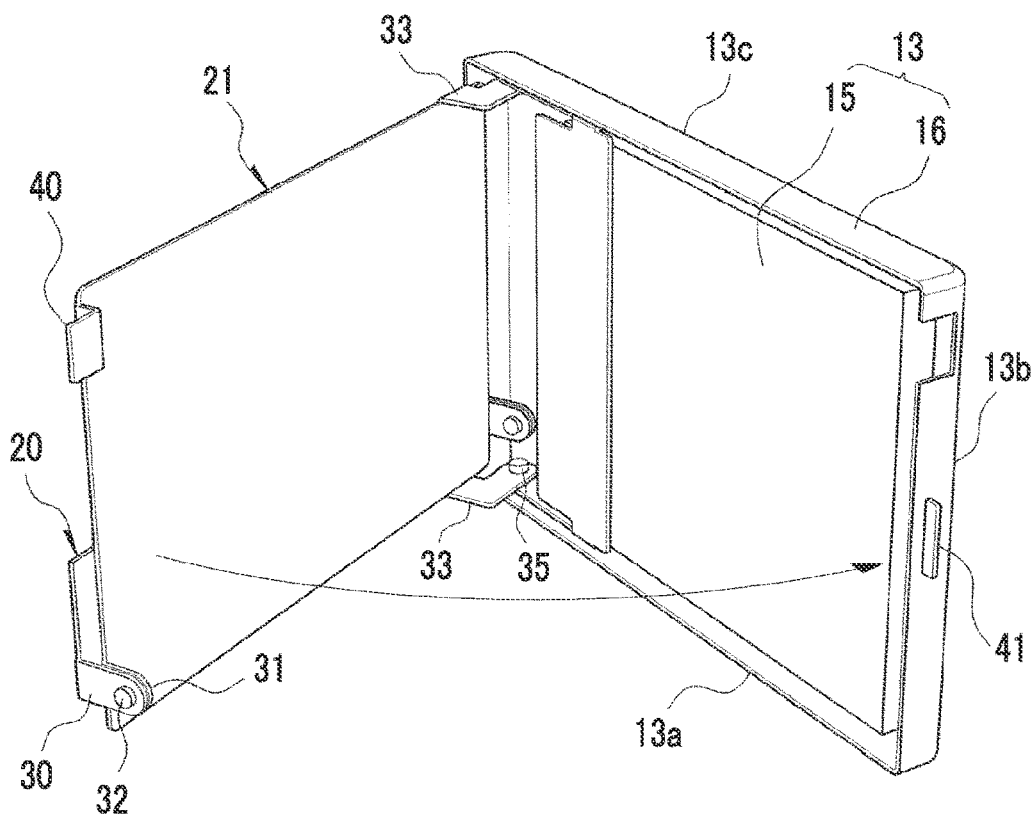
FIG. 9B is a schematic diagram illustrating an operation of the display of the imaging apparatus of FIG. 8.

In examples shown in FIGS. 8, 9A and 9B, a first rotational movement operating portion 40 and a second rotational movement operating portion 41 are included.

The first rotational movement operating portion 40 is provided to the support portion 21 of the hinge unit 14, and is disposed away from the axis A on a long side 13c located opposite to the long side 13a of the display 13 along which the axis A extends. The first rotational movement operating portion 40 is provided so as to be exposed to the outer circumference of the display 13 in a state where a portion of the cover 16 of the display 13 that covers the hinge unit 14 is cut out, and is constituted by a small piece-shaped protrusion capable of having a finger hooked thereon.

The second rotational movement operating portion 41 is provided to the display 13, and is disposed away from the axis B on the short side 13b located opposite to the short side 13d of the display 13 along which the axis B extends. The second rotational movement operating portion 41 is also constituted by a small piece-shaped protrusion capable of having a finger hooked thereon.

In a case where the first rotational movement operating portion 40 is lifted up, the support portion 21 of the hinge unit 14 provided with the first rotational movement operating portion 40 is rotationally moved about the axis A, and the display 13 supported by the support portion 21 is also rotationally moved about the axis A integrally with the support portion 21. In a case where the second rotational movement operating portion 41 is lifted up, the display 13 provided with the second rotational movement operating portion 41 is independently rotationally moved about the axis B. Thereby, the display 13 is prevented from being erroneously operated in its rotational movement about each of the axis A and the axis B, and thus it is possible to improve the rotational movement operability of the display 13.

Figure 10:
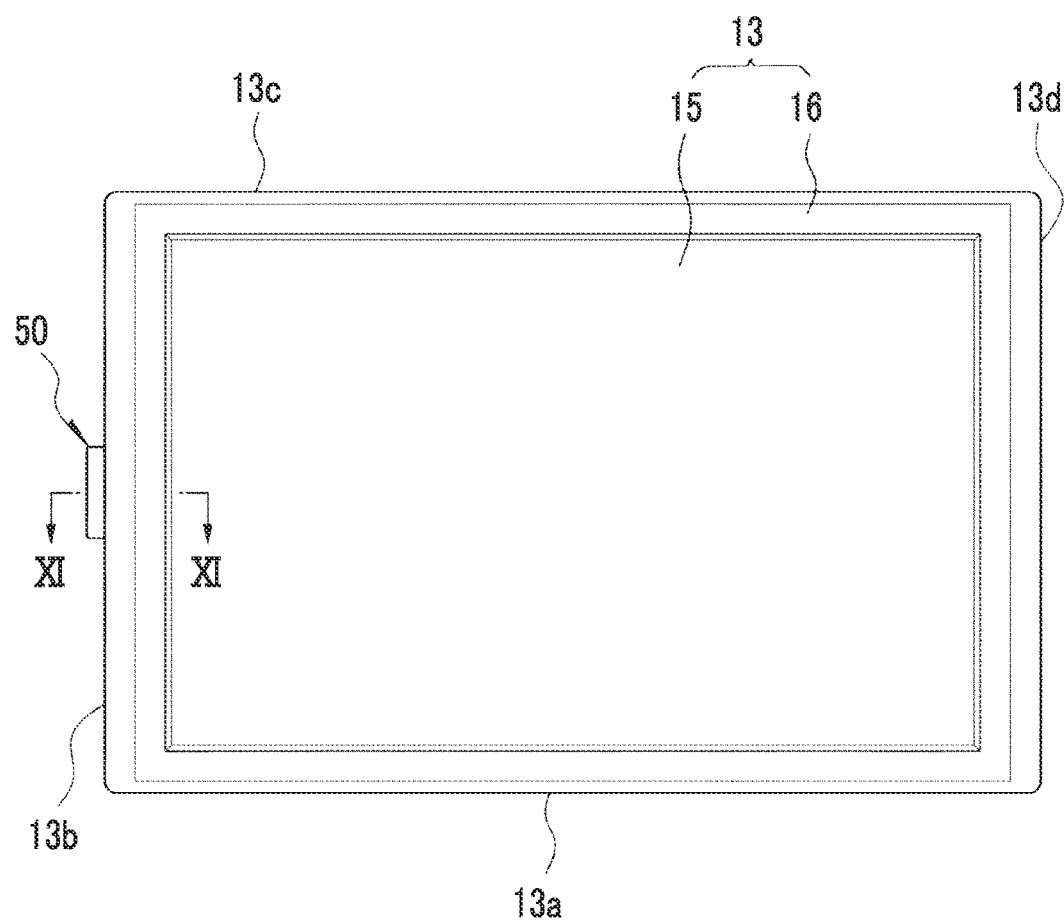
FIG. 10 is a front view of a display and a hinge unit which are other modification examples of the imaging apparatus of FIG. 1A.
Figure 11A:
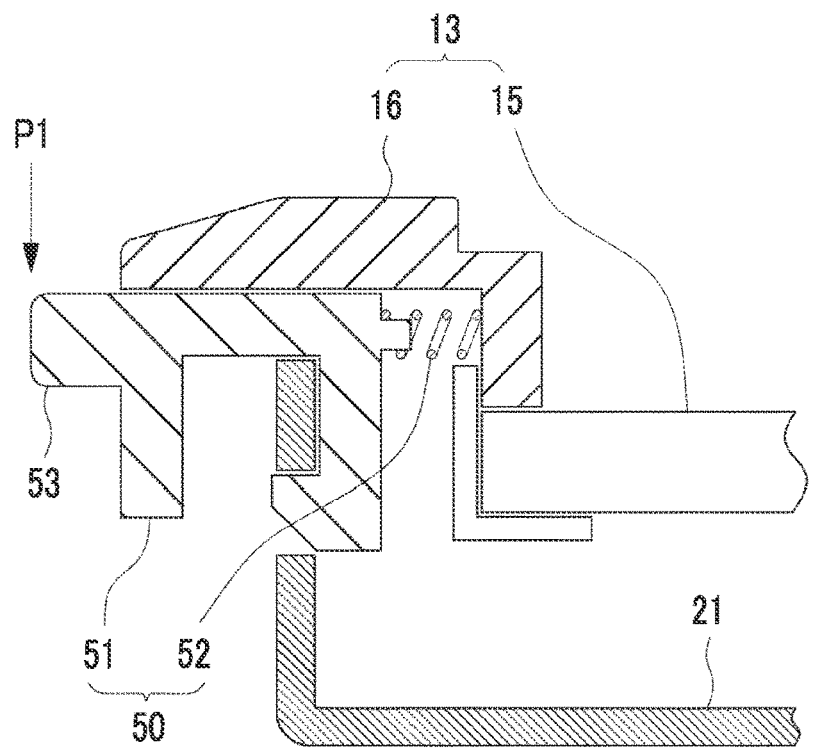
FIG. 11A is a cross-sectional view taken along line XI-XI in FIG. 10.
Figure 11B:
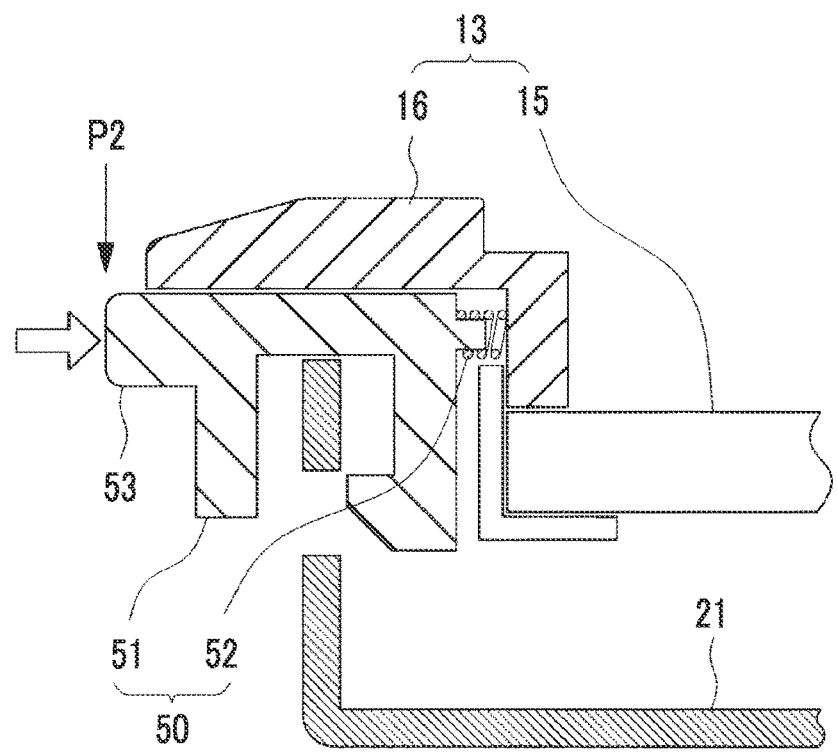
FIG. 11B is a cross-sectional view illustrating an operation of a rotational movement operating portion of FIG. 11A.

In the example shown in FIG. 8, FIGS. 9A and 9B, individual rotational movement operating portions are provided for the rotational movement of the display 13 about the axis A and the rotational movement of the display about the axis B, respectively, but examples shown in FIGS. 10, 11A and 11B show one rotational movement operating portion 50 which is simplified.

The rotational movement operating portion 50 is provided to the display 13, and is disposed away from the axis B on the short side 13b located opposite to the short side 13d of the display 13 along which the axis B extends.

The rotational movement operating portion 50 includes an engagement member 51 and a biasing member 52. The engagement member 51 is supported by the cover 16 of the display 13 so as to be movable between a locked position P1 engaged with the support portion 21 of the hinge unit 14 and an unlocked position P2 released from engagement with the support portion 21. The direction of movement from the locked position P1 of the engagement member 51 to the unlocked position P2 may be parallel to the axial direction of the axis A, and may be parallel to the axial direction of the axis B, which has no particular limitation thereon. The biasing member 52 biases the engagement member 51 toward the locked position P1.

The engagement member 51 is provided with a small piece-shaped protruding portion 53 which is exposed to the outer circumference of the display 13, and is capable of having a finger hooked thereon. By the operation of the protruding portion 53, the rotational movement operating portion 50 is lifted up, and the engagement member 51 is moved from the locked position P1 to the unlocked position P2.

In a case where the engagement member 51 is engaged with the support portion 21 of the hinge unit 14 at the locked position P1, the display 13 is integrated with the support portion 21. Since the support portion 21 is not rotatable about the axis B with respect to the main body 12, the display 13 is rotatable only about the axis A in a state where the engagement member 51 is engaged with the support portion 21. The lateral side of one short side 13b of the display 13 is exposed by the concave portion 17 which is open to one lateral side of the main body 12. For example, in a state where a finger is hooked on the exposed lateral side of the short side 13b, the lateral side of the short side 13b is lifted up, and the display 13 is rotationally moved about the axis A.

In a state where the engagement member 51 is moved to the unlocked position P2 and is released from engagement with the support portion 21, the display 13 is also rotatable about the axis B. In a case where the rotational movement operating portion 50 is lifted up in this state, the display 13 provided with the rotational movement operating portion 50 is independently rotationally moved about the axis B. Thereby, the display 13 is prevented from being erroneously operated in its rotational movement about each of the axis A and the axis B, and thus it is possible to improve the rotational movement operability of the display 13.

In each of examples shown in FIGS. 12, 13, 14A and 14B, the initial torque of rotational movement of the display 13 about the axis B is made larger than the initial torque of rotational movement of the display 13 about the axis A. Meanwhile, the initial torque of rotational movement of the display 13 about each of the axis A and the axis B refers to a torque required during initial movement when the display 13 disposed along the rear surface of the main body 12 is rotationally moved in the direction of separating from the rear surface of the main body 12.

In addition, the lateral side of one short side 13b of the display 13 is exposed by the concave portion 17 which is open to one lateral side of the main body 12. In the present example, in a state where a finger is hooked on the exposed lateral side of the short side 13b, the lateral side of the short side 13b is lifted up, and the display 13 is rotationally moved in the direction of separating from the rear surface of the main body 12.

The revolution radius of an operation region about the axis B on the lateral side of the short side 13b becomes longer than the revolution radius thereof about the axis A. Consequently, the initial torque of rotational movement of the display 13 about the axis B is made relatively large, and thus an operation load during the rotational movement of the display 13 about the axis B can be made substantially equal to an operation load during the rotational movement of the display about the axis A, or can be made larger than an operation load during the rotational movement of the display about the axis A. Thereby, the display 13 is prevented from being carelessly rotationally moved about the axis B, and thus it is possible to improve the rotational movement operability of the display 13.

Figure 12:
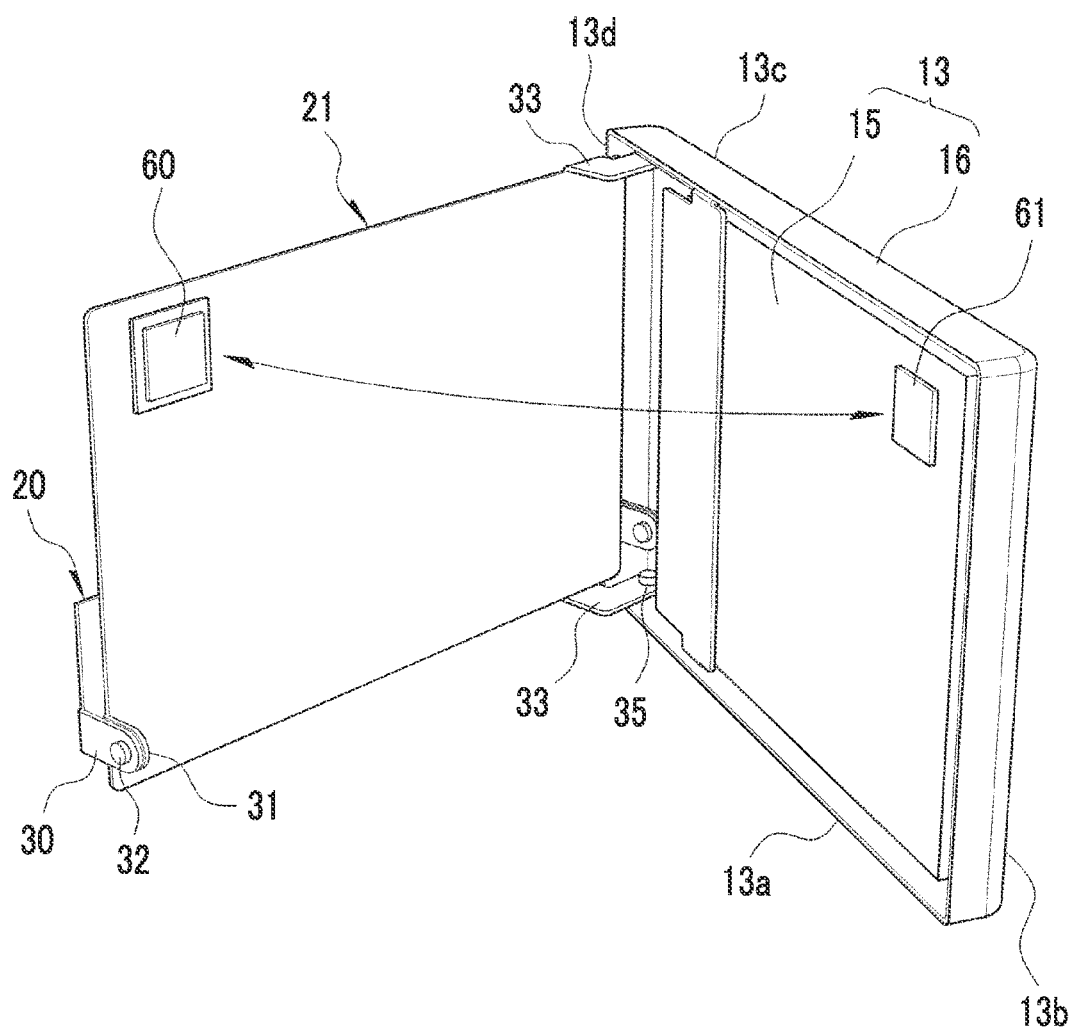
FIG. 12 is a perspective view of a display and a hinge unit which are other modification examples of the imaging apparatus of FIG. 1A.

In an example shown in FIG. 12, a pair of magnets are included.

One magnet 60 is provided to the support portion 21 of the hinge unit 14, and the other magnet 61 is provided to the display 13. The magnet 60 and the magnet 61 are disposed away from the axis B on the short side 13b located opposite to the short side 13d of the display 13 along which the axis B extends, and are disposed so that magnetic poles different from each other face each other.

The display 13 is absorptively fixed to the support portion 21 due to an attractive force which is generated between the magnet 60 and the magnet 61. Since the magnet 60 and the magnet 61 are disposed away from the axis B on the short side 13b located opposite to the short side 13d of the display 13 along which the axis B extends, the initial torque of rotational movement of the display 13 about the axis B is increased due to the attractive force between magnet 60 and the magnet 61. A torque about the axis B based on the attractive force between the magnet 60 and the magnet 61 is appropriately adjusted depending on surface magnetic flux density and facing interval between the magnet 60 and the magnet 61, and a distance between the magnets 60 and 61 and the axis B, and the initial torque of rotational movement of the display 13 about the axis B is set to be larger than the initial torque of rotational movement of the display about the axis A.

Preferably, the magnet 60 and the magnet 61 are provided adjacent to the short side 13b located opposite to the short side 13d of the display 13 along which the axis B extends so that the attractive force between the magnet 60 and the magnet 61 effectively acts as a torque about the axis B.

Further, when the display 13 rotationally moved about the axis B in the direction of separating from the rear surface of the main body 12 is rotationally moved again in a direction along the rear surface of the main body 12, the attractive force between the magnet 60 and the magnet 61 also acts so as to attract the display 13 to the rear surface of the main body 12. The display 13 rotationally moved up to the vicinity of the rear surface of the main body 12 is attracted to the rear surface of the main body 12 due to the attractive force between the magnet 60 and the magnet 61, and is automatically disposed at a proper position along the rear surface of the main body 12. Thereby, it is possible to further improve the rotational movement operability of the display 13.

Figure 13:
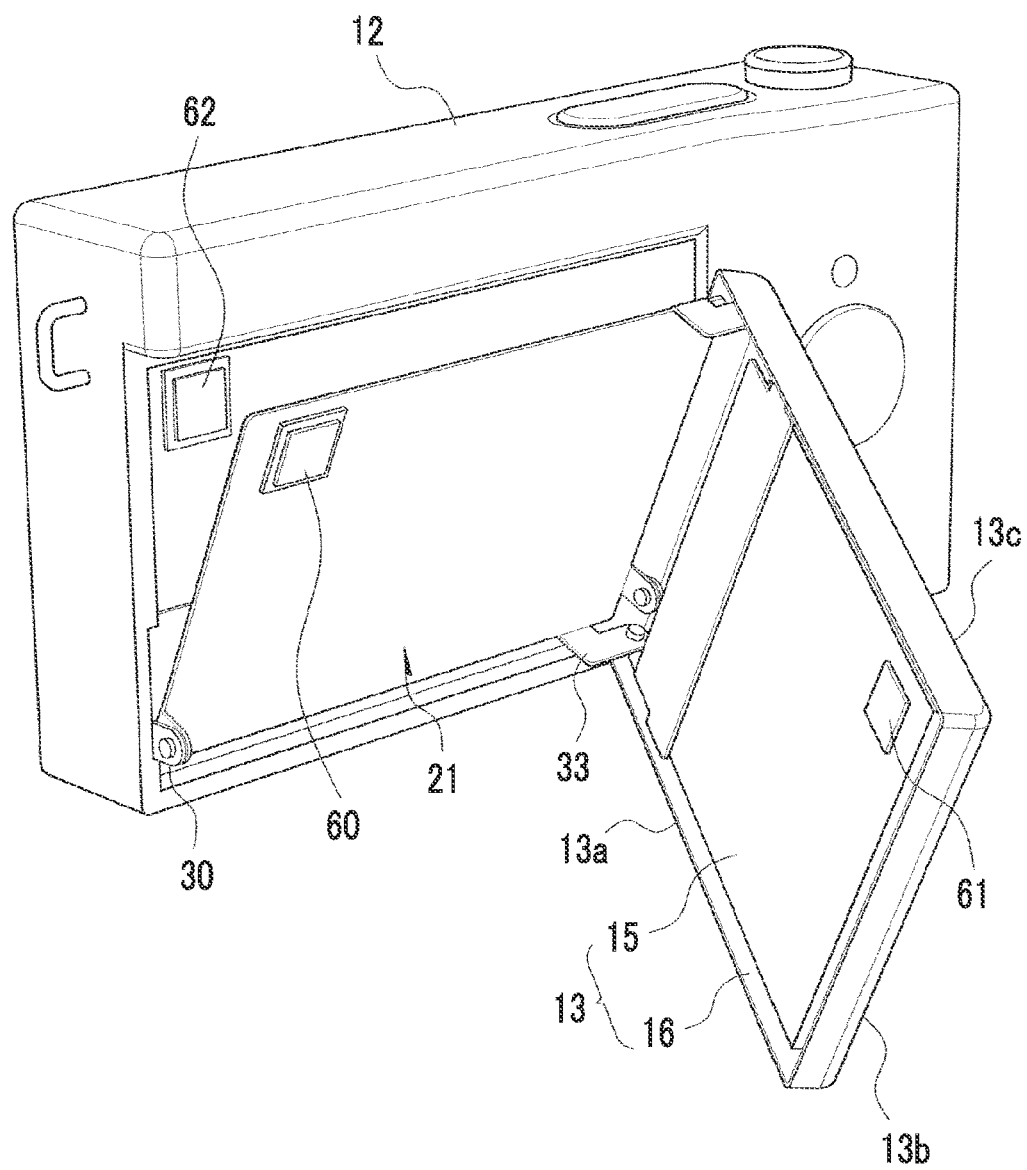
FIG. 13 is a perspective view of a modification example of the imaging apparatus of FIG. 12.

Meanwhile, as shown in FIG. 13, when the main body 12 is provided with a magnet 62, and the display 13 rotationally moved about the axis A in the direction of separating from the rear surface of the main body 12 is rotationally moved again in a direction along the rear surface of the main body 12 due to an attractive force which is generated between the magnet 62 provided to the support portion 21 of the hinge unit 14 and the magnet 60, the display 13 may be attracted to the rear surface of the main body 12. In this case, from the viewpoint that the initial torque of rotational movement of the display 13 about the axis B is made relatively large, the attractive force between the magnet 60 and the magnet 62 is set to be smaller than the attractive force between magnet 60 and the magnet 61, and thus, for example, the surface magnetic flux density of the magnet 62 becomes smaller than the surface magnetic flux density of the magnet 61, or the facing interval between the magnet 60 and magnet 62 becomes larger than the facing interval between the magnet 60 and the magnet 61.

The attraction of the display 13 to the rear surface of the main body 12 can also be performed by a click mechanism giving a click feeling to the rotational movement operation of the display 13, and the initial torque of rotational movement of the display 13 about the axis B can also be made relatively large using this click mechanism.

Figure 14A:
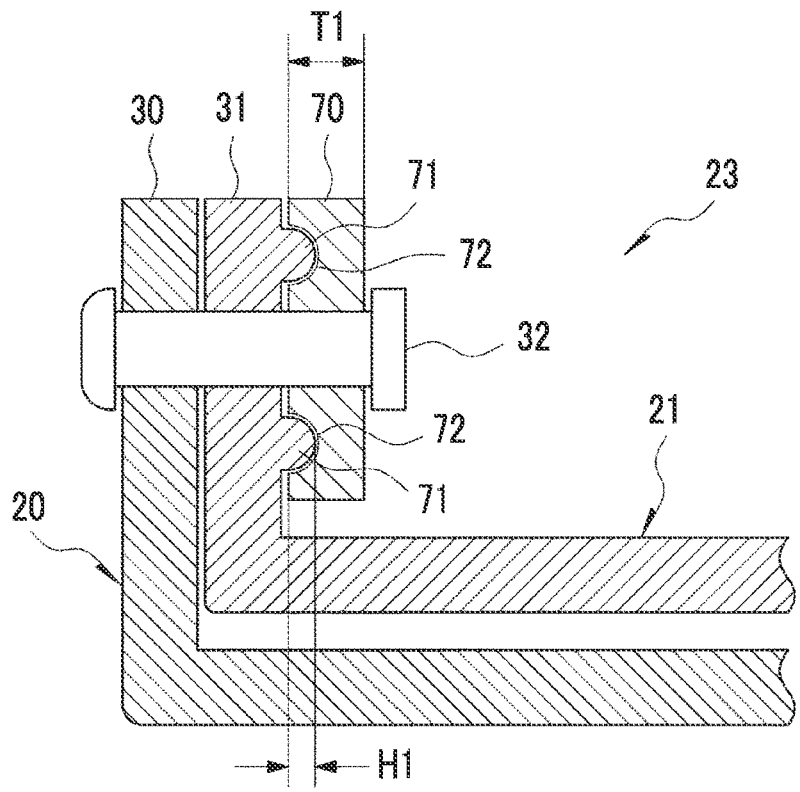
FIG. 14A is a cross-sectional view of a first hinge of a hinge unit which is another modification example of the imaging apparatus of FIG. 1A.
Figure 14B:
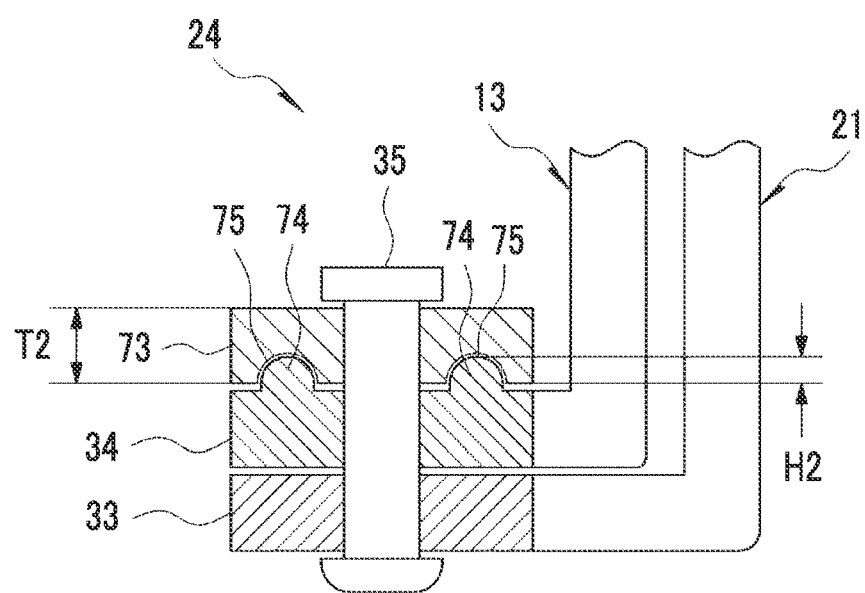
FIG. 14B is a cross-sectional view of a second hinge of the hinge unit which is another modification example of the imaging apparatus of FIG. 1A.

In the example shown in FIGS. 14A and 14B, the first hinge 23 and the second hinge 24 are each provided with a click mechanism.

The click mechanism of the first hinge 23 includes a sliding contact plate 70, provided adjacent to the hinge bracket 31 of the support portion 21 constituting the first hinge 23, which is fixed to the hinge pin 32. The hinge bracket 31 is provided with a convex portion 71, and the sliding contact plate 70 is provided with a concave portion 72. The convex portion 71 and the concave portion 72 are engaged with each other in a state where the display 13 is disposed along the rear surface of the main body 12. Meanwhile, the hinge bracket 31 may be provided with a concave portion, and the sliding contact plate 70 may be provided with a convex portion.

In a case where the display 13 disposed along the rear surface of the main body 12 is rotationally moved about the axis A in the direction of separating from the rear surface of the main body 12, the support portion 21 is also rotationally moved integrally with the display 13, the hinge bracket 31 and the sliding contact plate 70 are rotationally moved relative to each other, and the engagement of the convex portion 71 with the concave portion 72 is released. In a case where the display 13 is rotationally moved again in a direction along the rear surface of the main body 12, the convex portion 71 and the concave portion 72 are engaged with each other, the display 13 is attracted to the rear surface of the main body 12 in the process of the engagement of the convex portion 71 with the concave portion 72, and a click feeling is generated at a timing when the engagement of the convex portion 71 with the concave portion 72 is completed.

The click mechanism of the second hinge 24 includes a sliding contact plate 73, provided adjacent to the hinge bracket 34 of the display 13 constituting the second hinge 24, which is fixed to the hinge pin 35. The hinge bracket 34 is provided with a convex portion 74, and the sliding contact plate 73 is provided with a concave portion 75. The convex portion 74 and the concave portion 75 are engaged with each other in a state where the display 13 is disposed along the rear surface of the main body 12. Meanwhile, the hinge bracket 34 may be provided with a concave portion, and the sliding contact plate 73 may be provided with a convex portion.

In a case where the display 13 disposed along the rear surface of the main body 12 is rotationally moved about the axis B in the direction of separating from the rear surface of the main body 12, the hinge bracket 34 and the sliding contact plate 73 are rotationally moved relative to each other, and the engagement of the convex portion 74 with the concave portion 75 is released in association with the elastic bending of the sliding contact plate 73. In a case where the display 13 is rotationally moved again in a direction along the rear surface of the main body 12, the convex portion 74 and the concave portion 75 are engaged with each other, the display 13 is attracted to the rear surface of the main body 12 in the process of the engagement of the convex portion 74 with the concave portion 75, and a click feeling is generated at a timing when the engagement of the convex portion 74 with the concave portion 75 is completed.

In the click mechanism of the first hinge 23 described above, the sliding contact plate 70 is elastically bent when the engagement of the convex portion 71 with the concave portion 72 is released, and a force required for the deformation of the sliding contact plate 70 is set to the initial torque of rotational movement of the display 13 about the axis A. Similarly, in the click mechanism of the second hinge 24, the sliding contact plate 73 is elastically bent when the engagement of the convex portion 74 with the concave portion 75 is released, and a force required for the deformation of the sliding contact plate 73 is set to the initial torque of rotational movement of the display 13 about the axis B.

Consequently, for example, an engagement margin H2 between the convex portion 74 and the concave portion 75 of the click mechanism of the second hinge 24 is made larger than an engagement margin H1 between the convex portion 71 and the concave portion 72 of the click mechanism of the first hinge 23, and thus the initial torque of rotational movement of the display 13 about the axis B can be made relatively large. In addition, a thickness T2 of the sliding contact plate 73 of the click mechanism of the second hinge 24 is made larger than a thickness T1 of the sliding contact plate 70 of the click mechanism of the first hinge 23, and thus the initial torque of rotational movement of the display 13 about the axis B can also be made relatively large.

Figure 15:
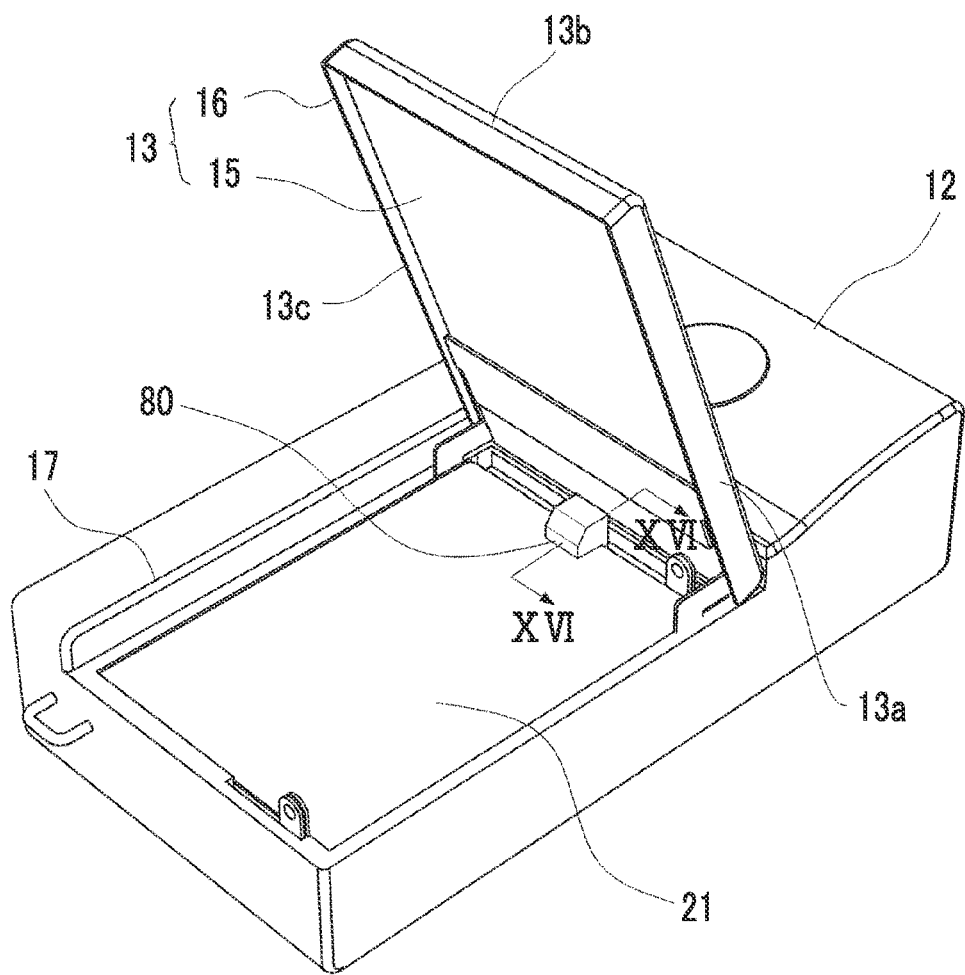
FIG. 15 is a perspective view of another modification example of the imaging apparatus of FIG. 1A.
Figure 16A:
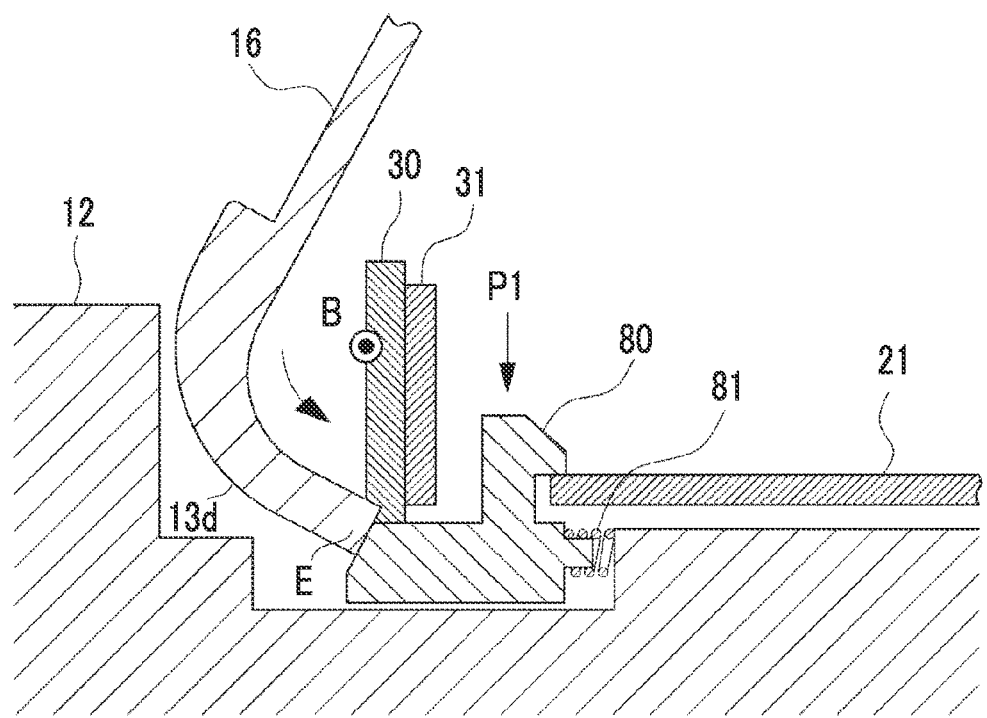
FIG. 16A is a cross-sectional view taken along line XVI-XVI in FIG. 15.
Figure 16B:
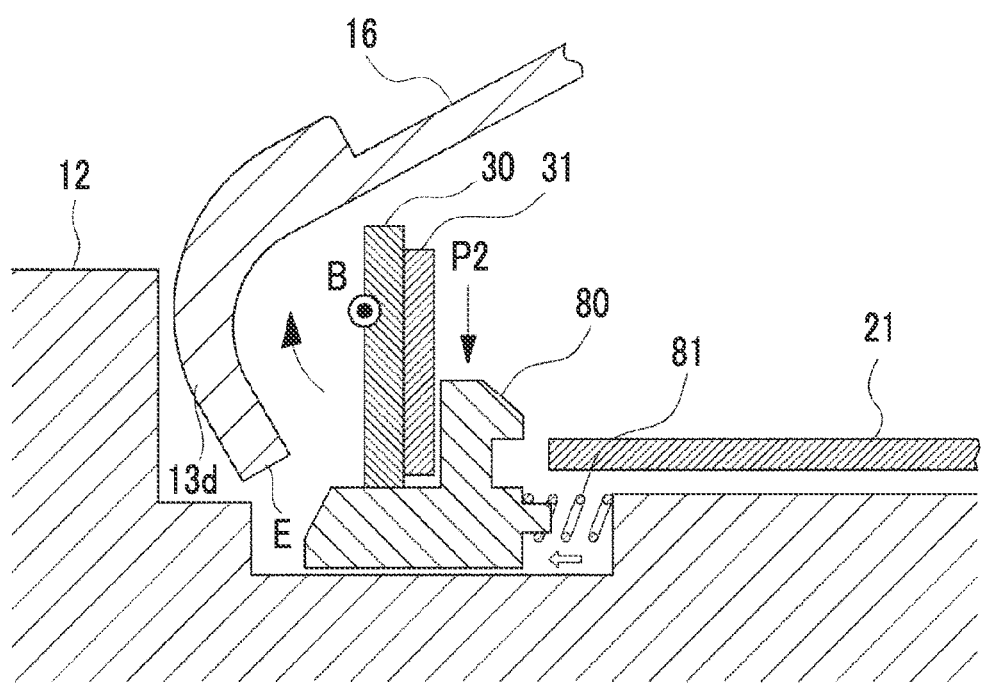
FIG. 16B is a cross-sectional view illustrating an operation of an engagement member of FIG. 16A.

Examples shown in FIGS. 15, 16A and 16B show that, in a case where the display 13 is rotationally moved about the axis B, the display 13 is prevented from being rotationally moved about the axis A.

The concave portion 17 of the main body 12 having the display 13 received therein is provided with an engagement member 80 and a biasing member 81. The engagement member 80 is disposed on a revolution trajectory about the axis B of an edge E of the cover 16 constituting the lateral side of the short side 13d of the display 13 along which the axis B extends, and is pressed by the edge E of the cover 16 when the display 13 disposed along the rear surface of the main body 12 is rotationally moved about the axis B in the direction of separating from the rear surface of the main body 12.

The engagement member 80 is supported by the main body 12 so as to be movable in a pressing direction between the locked position P1 at which the support portion 21 is fixed to the main body 12 by engagement with the support portion 21 of the hinge unit 14 and the unlocked position P2 released from the engagement with the support portion 21.

The biasing member 81 biases the engagement member 80 toward the unlocked position P2.

In a state where the engagement member 80 is released from the engagement with support portion 21 of the hinge unit 14 at the unlocked position P2, the display 13 is rotatable about each of the axis A and the axis B. The lateral side of one short side 13b of the display 13 is exposed by the concave portion 17 which is open to one lateral side of the main body 12. For example, the lateral side of the short side 13b is lifted up in a state where a finger is hooked on the exposed lateral side of the short side 13b, and the display 13 is rotationally moved about the axis A or the axis B.

In a case where the display 13 is rotationally moved about the axis B, the engagement member 80 is moved to the locked position P1 due to pressure by the edge E of the cover 16 of the display 13, and engages with the support portion 21 of the hinge unit 14. The support portion 21 is fixed to the main body 12 by the engagement of the engagement member 80 with the support portion 21, the support portion 21 is prevented from being rotationally moved about the axis A, and the display 13 is also prevented from being rotationally moved about the axis A.

In this manner, in a case where the display 13 is rotationally moved about the axis B, the unnecessary rotational movement of the display 13 is eliminated by preventing the display 13 from being rotationally moved about the axis A, and thus it is possible to improve the rotational movement operability of the display 13.

Figure 17A:
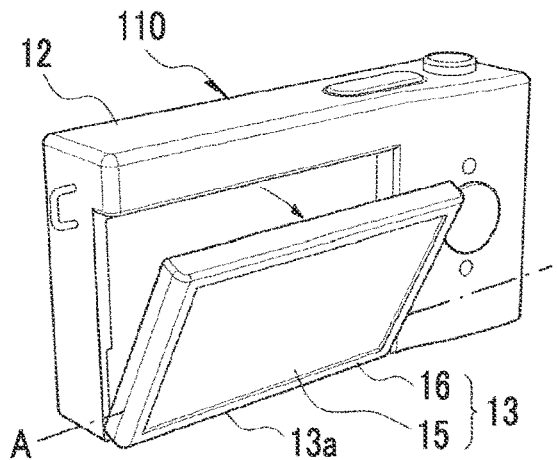
FIG. 17A is a schematic diagram illustrating an operation of another example of the imaging apparatus according to an embodiment of the present invention.
Figure 17B:
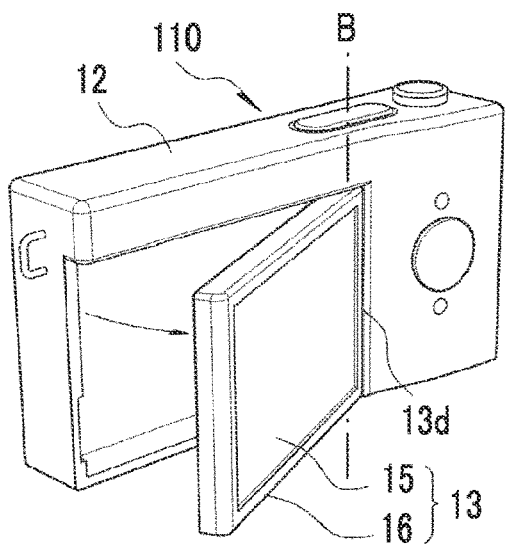
FIG. 17B is a schematic diagram illustrating an operation of the imaging apparatus of FIG. 17A.
Figure 17C:
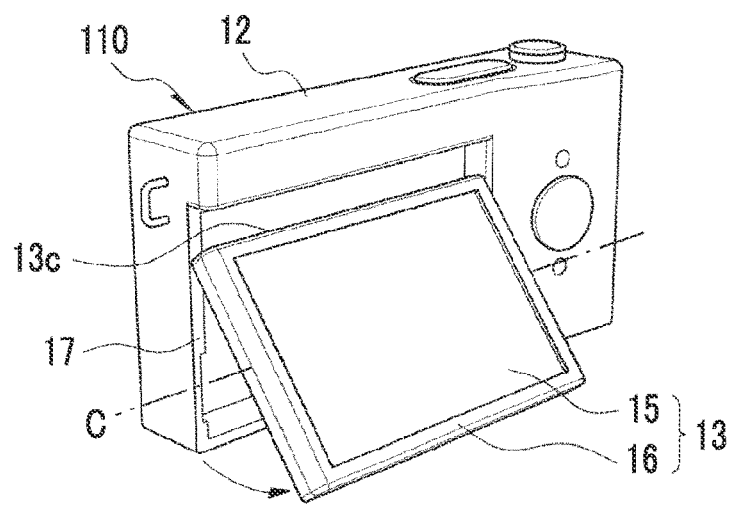
FIG. 17C is a schematic diagram illustrating an operation of the imaging apparatus of FIG. 17A.

FIGS. 17A to 17C show another example of an imaging apparatus according to an embodiment of the present invention. Meanwhile, common components with respect to those of the above-described digital camera 10 are denoted by common reference numerals and signs, and thus the description thereof will be omitted or simplified.

A digital camera 110 as an imaging apparatus shown in FIGS. 17A to 17C includes a main body 12 having an imaging element, a display 13, and a hinge unit. The hinge unit movably connects the display 13 to the main body 12. In the present example, the hinge unit connects the display 13 to the main body 12 so as to be rotationally movable about an axis A (first axis) extending along the long side 13a of the display 13, to be rotationally movable about an axis B (third axis) which is substantially at right angles to the axis A and extends along the short side 13d of the display 13, and to be rotationally movable about an axis C (second axis) parallel to the axis A which is biased toward the long side 13c of the display 13 with respect to the axis A.

Figure 18:
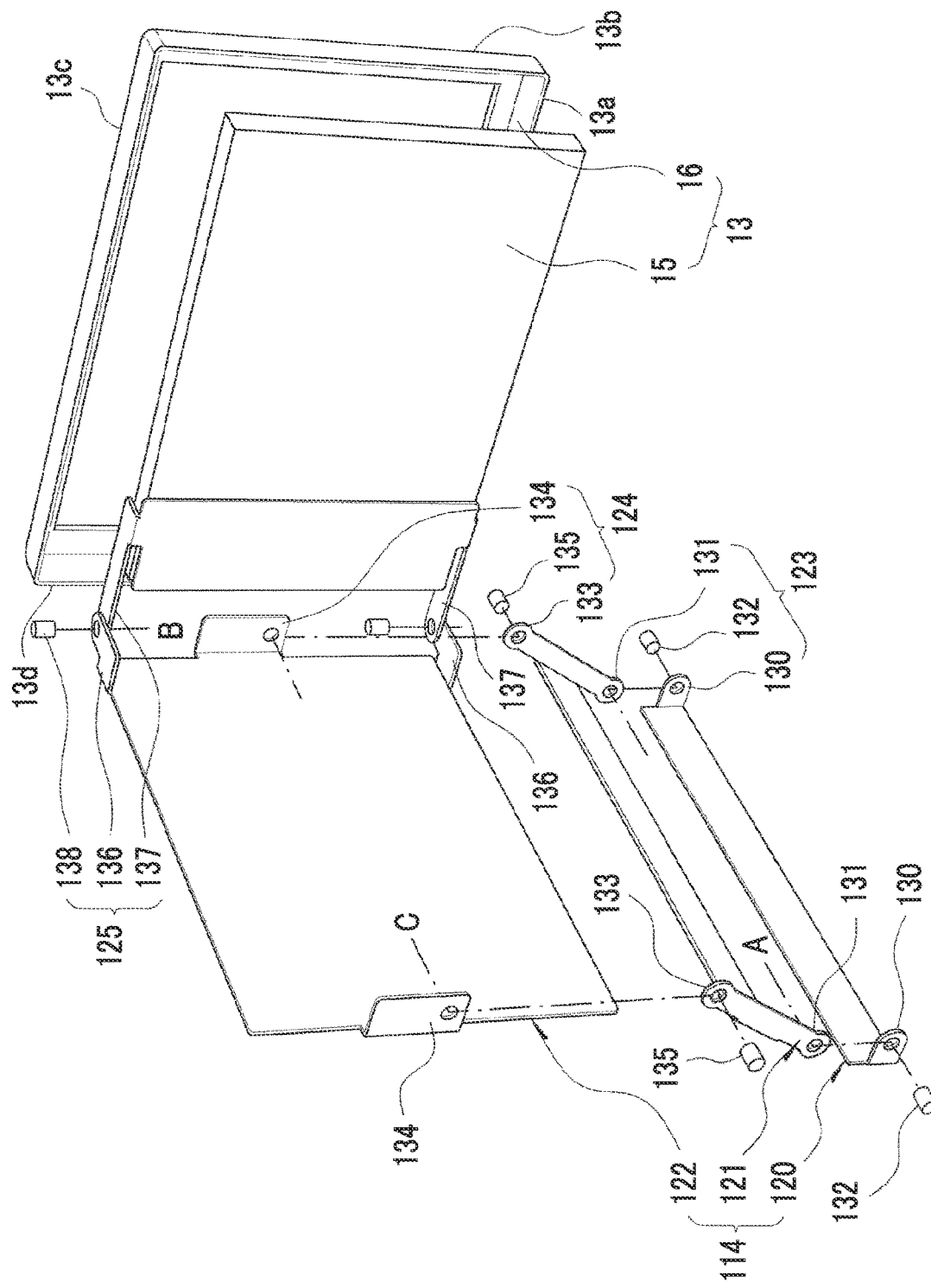
FIG. 18 is an exploded perspective view of a hinge unit of the imaging apparatus of FIG. 17A.

FIG. 18 shows a configuration of the hinge unit of the digital camera 110.

A hinge unit 114 includes a fixed portion 120 which is fixed to the bottom of the concave portion 17 of the main body 12, and a first support portion 121 and a second support portion 122 that support the display 13.

The fixed portion 120 is provided with a pair of hinge brackets 130 which are disposed on the axis A, and the first support portion 121 is provided with a pair of hinge brackets 131 which are superimposed on the hinge brackets 130 in the axial direction of the axis A. The hinge bracket 130 and the hinge bracket 131 which are superimposed on each other are coupled by a hinge pin 132 so as to be rotatable relative to each other.

A first hinge 123 disposed on the axis A is constituted by the hinge bracket 130, the hinge bracket 131 and the hinge pin 132. The first support portion 121 is connected to the main body 12 through the fixed portion 120 so as to be rotationally movable about the axis A by a pair of first hinges 123 on the axis A.

The first support portion 121 is provided with a pair of hinge brackets 133 which are disposed on the axis C, and the second support portion 122 is provided with a pair of hinge brackets 134 which are superimposed on the hinge brackets 133 in the axial direction of the axis C. The hinge bracket 133 and the hinge bracket 134 which are superimposed on each other are coupled by a hinge pin 135 so as to be rotatable relative to each other.

A second hinge 124 which is disposed on the axis C is constituted by the hinge bracket 133, the hinge bracket 134 and the hinge pin 135. The second support portion 122 is supported by the first support portion 121 so as to be rotationally movable about the axis C by a pair of second hinges 124 on the axis C.

The second support portion 122 is provided with a pair of hinge brackets 136 which are disposed on the axis B, and the display 13 is provided with a pair of hinge brackets 137 which are superimposed on the hinge brackets 136 in the axial direction of the axis B. The hinge bracket 136 and the hinge bracket 137 which are superimposed on each other are coupled by a hinge pin 138 so as to be rotatable relative to each other.

A third hinge 125 which is disposed on the axis B is constituted by the hinge bracket 136, the hinge bracket 137 and the hinge pin 138. The display 13 is supported by the second support portion 122 so as to be rotationally movable about the axis B by a pair of third hinges 125 on the axis B.

According to the hinge unit 114 described above, the display 13 is rotationally moved about the axis A integrally with the first support portion 121 and the second support portion 122 of the hinge unit 14, is rotationally moved about the axis C integrally with the second support portion 122, and is independently rotationally moved about the axis B.

In a state where the display 13 is received in the concave portion 17 and is disposed along the rear surface of the main body 12, the hinge unit 114 is covered with the cover 16 of the display 13, and is not exposed to the outward appearance of the digital camera 10. The hinge unit 114 is not exposed to the outward appearance of the digital camera 10, and thus it is possible to improve the design of the digital camera 10.

Figure 19A:
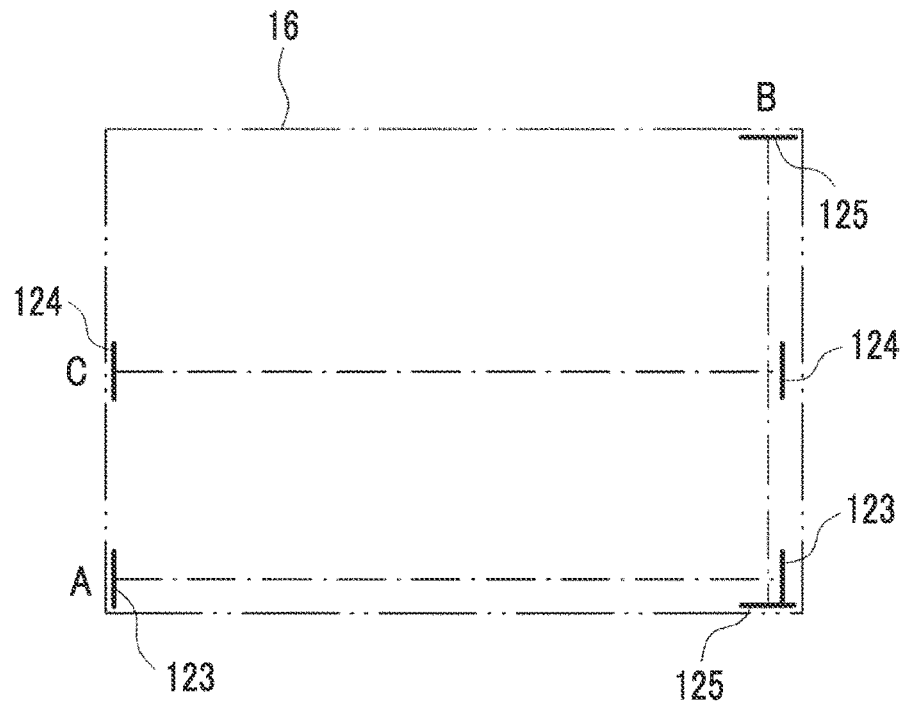
FIG. 19A is a schematic diagram illustrating disposition of a pair of first hinges, a pair of second hinges and a pair of third hinges of the hinge unit of FIG. 18.
Figure 19B:
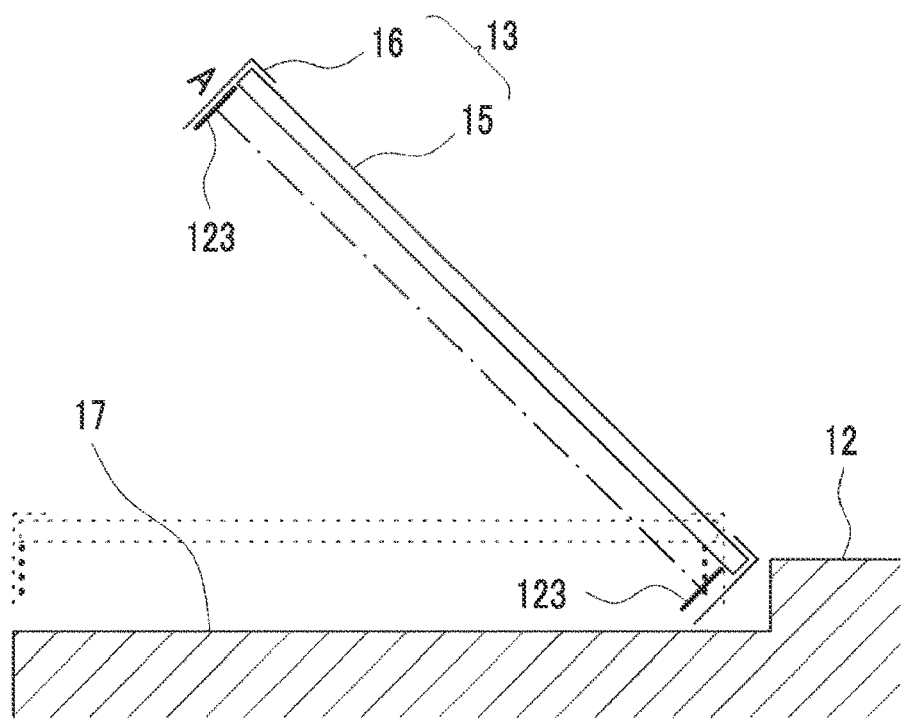
FIG. 19B is a schematic diagram illustrating a trajectory of the hinge unit of FIG. 19A when the hinge unit is rotationally moved about the axis of the pair of third hinges.

FIG. 19A schematically shows the disposition of the pair of first hinges 123, the pair of second hinges 124 and the pair of third hinges 125 of the hinge unit 114, and FIG. 19B schematically shows a trajectory of the hinge unit 114 when the hinge unit 114 is rotationally moved about the axis B of the pair of third hinges 125.

As shown in FIGS. 19A and 19B, in the hinge unit 114 of the present example, one first hinge 123 of the pair of first hinges 123 on the axis A which is located closer to the axis B and one second hinge 124 of the pair of second hinges 124 on the axis C which is located closer to the axis B are disposed between the pair of third hinges 125 on the axis B. In the drawings, the frame of a dashed-two dotted line shows the outer circumference of the cover 16 when the display panel 15 of the display 13 is seen from the front.

FIGS. 20A, 20B, 21A, 21B, 22A and 22B show a case where one first hinge 123 of the pair of first hinges 123 which is located closer to the axis B and one second hinge 124 of the pair of second hinges 124 which is located closer to the axis B are disposed away from between the pair of third hinges 125.

Figure 20A:
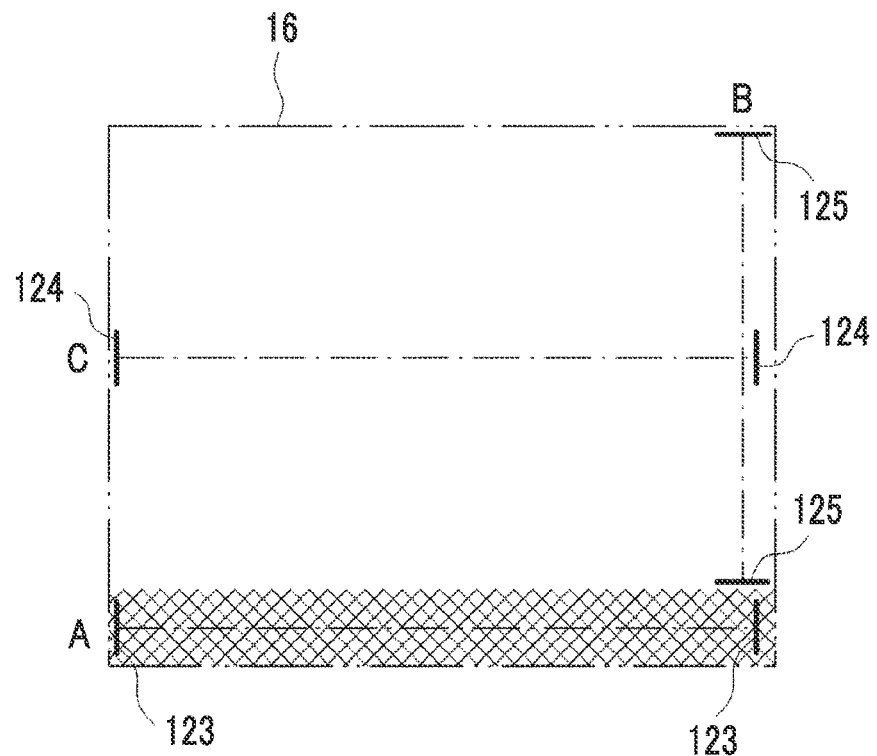
FIG. 20A is a schematic diagram illustrating a reference example of the disposition of the pair of first hinges, the pair of second hinges and the pair of third hinges.
Figure 20B:
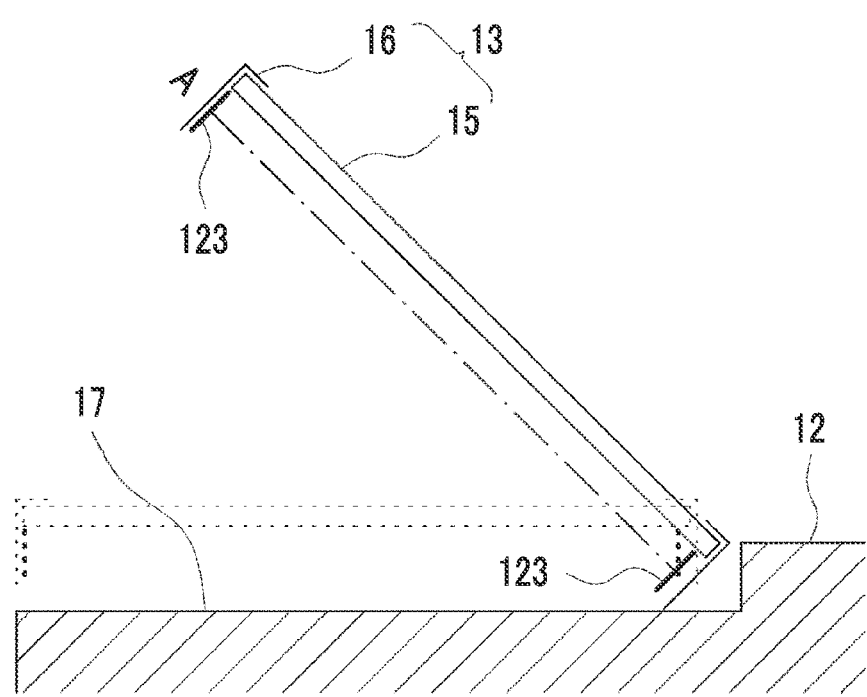
FIG. 20B is a schematic diagram illustrating a trajectory of the hinge unit of FIG. 20A when the hinge unit is rotationally moved about the axis of the pair of third hinges.

FIGS. 20A and 20B show a case where the first hinge 123 and the second hinge 124 which are located closer to the axis B are disposed away from between the pair of third hinges 125 in the axial direction of the axis B, and the axis A and the axis C, and the axis B intersect each other on the outer side of the pair of third hinges 125. In this case, the outer circumferences of the hinge unit 114 and the cover 16 that covers the hinge unit 114 are extended, as cross-hatched in the drawings, in the axial direction of the axis B with respect to the outer circumferences of the hinge unit 114 and the cover 16 shown in FIGS. 19A and 19B.

Figure 21A:
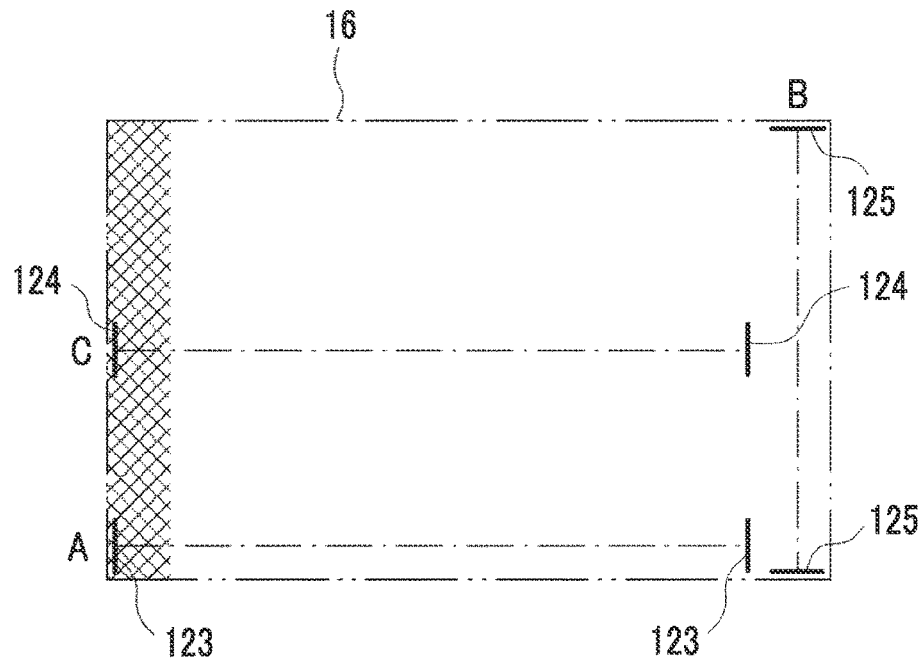
FIG. 21A is a schematic diagram illustrating a reference example of the disposition of the pair of first hinges, the pair of second hinges and the pair of third hinges.
Figure 21B:
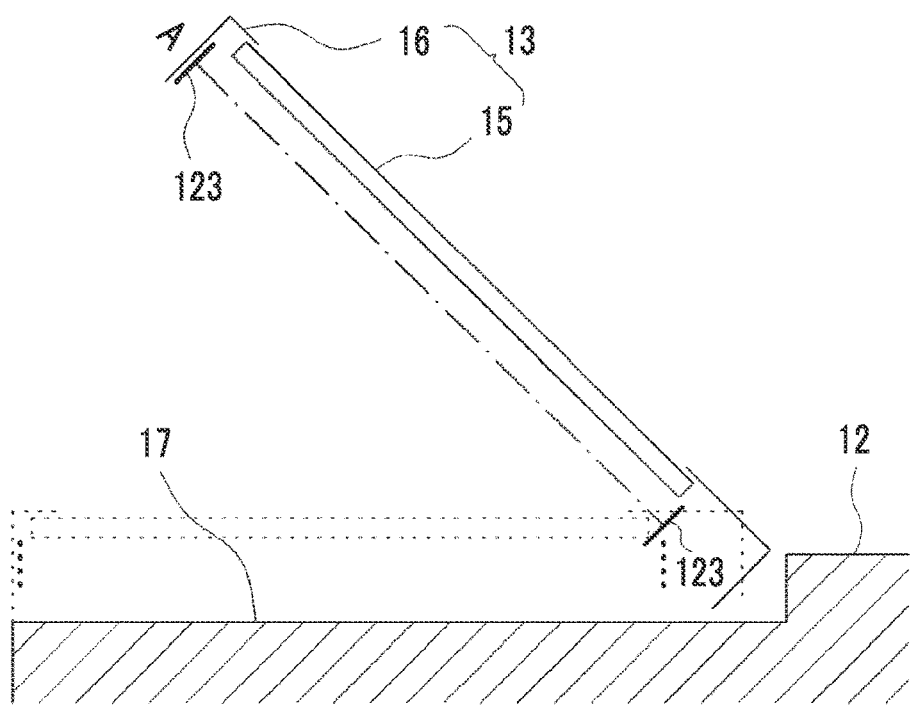
FIG. 21B is a schematic diagram illustrating a trajectory of the hinge unit of FIG. 21A when the hinge unit is rotationally moved about the axis of the pair of third hinges.

FIGS. 21A and 21B show a case where the first hinge 123 and the second hinge 124 which are located closer to the axis B are disposed away from between the pair of third hinges 125 in the axial direction of the axis A, the axis A and the axis B intersect each other on the outer side of the pair of first hinges 123, and the axis C and the axis B intersect each other on the outer side of the pair of second hinges 124. In this case, the outer circumferences of the hinge unit 114 and the cover 16 that covers the hinge unit 114 are extended, as cross-hatched in the drawings, in the axial direction of the axis A with respect to the outer circumferences of the hinge unit 114 and the cover 16 shown in FIGS. 19A and 19B.

Figure 22A:
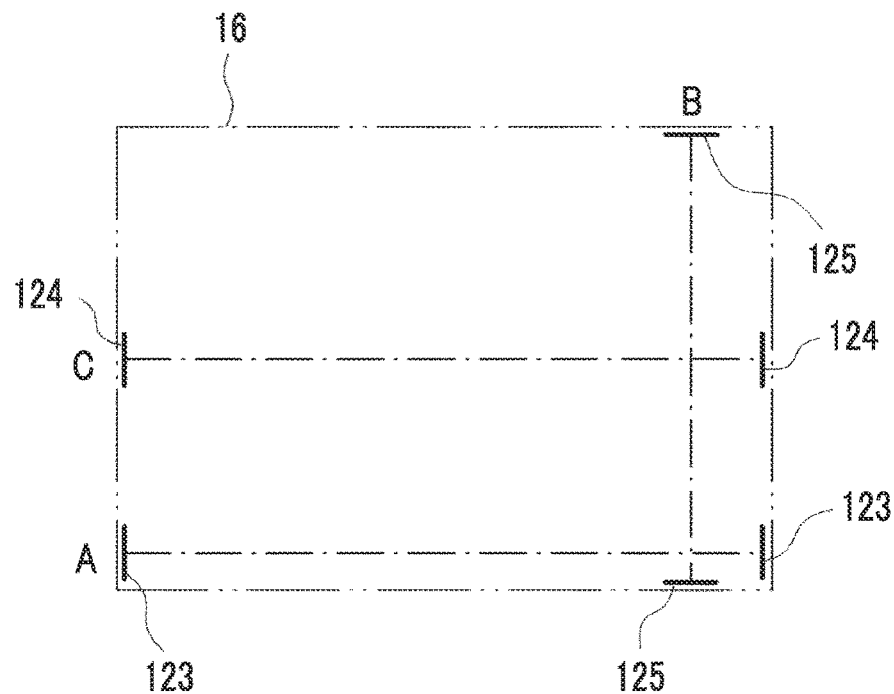
FIG. 22A is a schematic diagram illustrating a reference example of the disposition of the pair of first hinges, the pair of second hinges and the pair of third hinges.
Figure 22B:
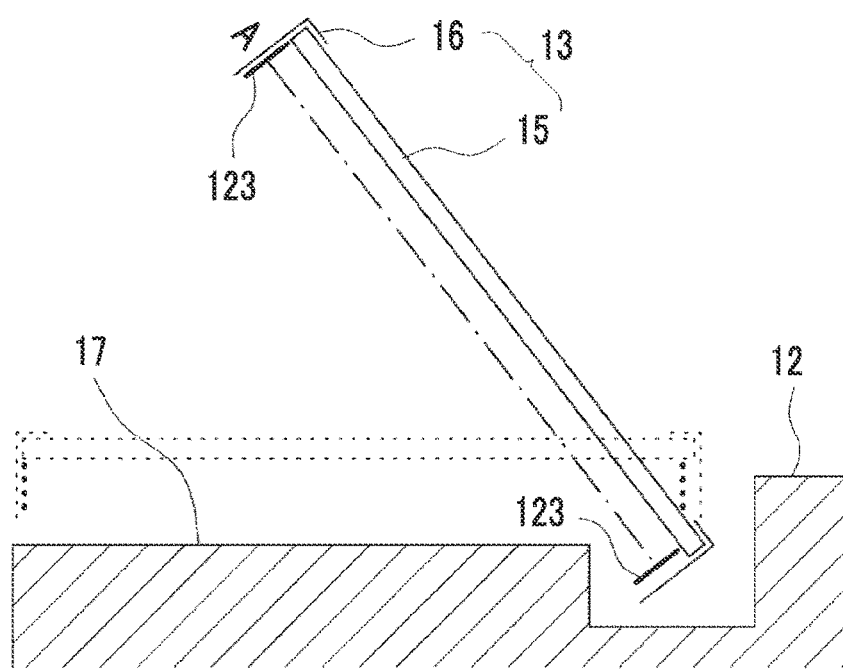
FIG. 22B is a schematic diagram illustrating a trajectory of the hinge unit of FIG. 22A when the hinge unit is rotationally moved about the axis of the pair of third hinges.
Figure 23:
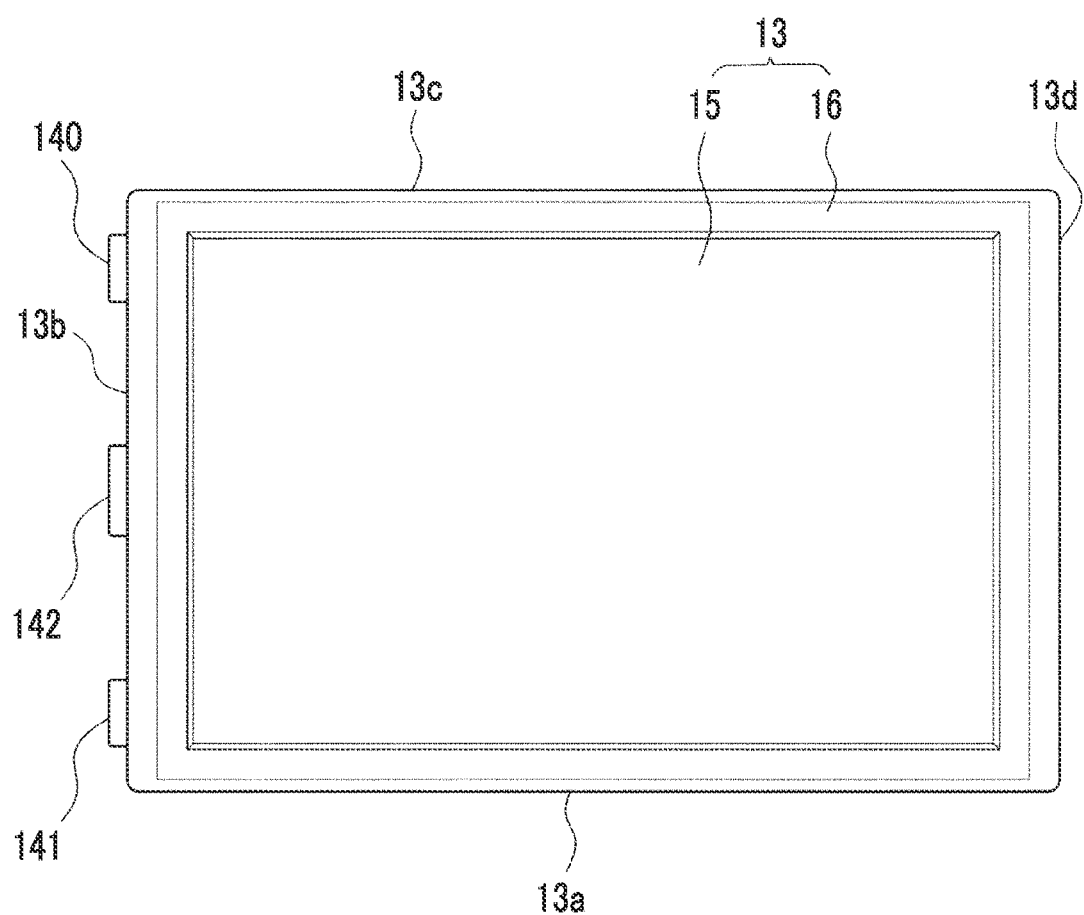
FIG. 23 is a front view of a display and a hinge unit which are modification examples of the imaging apparatus of FIG. 17A.
Figure 24A:
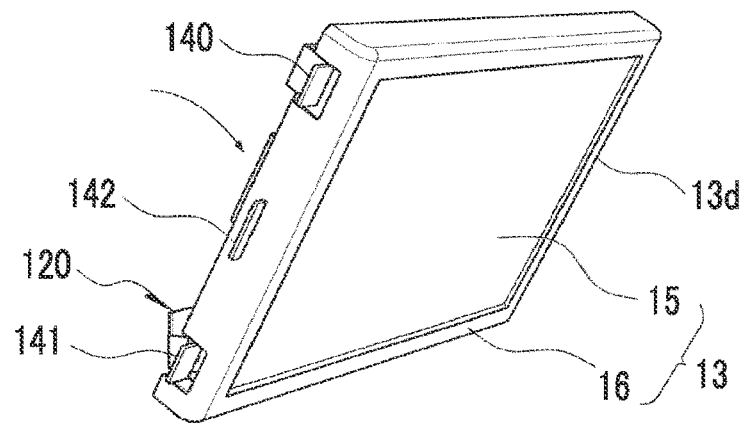
FIG. 24A is a schematic diagram illustrating an operation of the display of the imaging apparatus of FIG. 23.
Figure 24B:
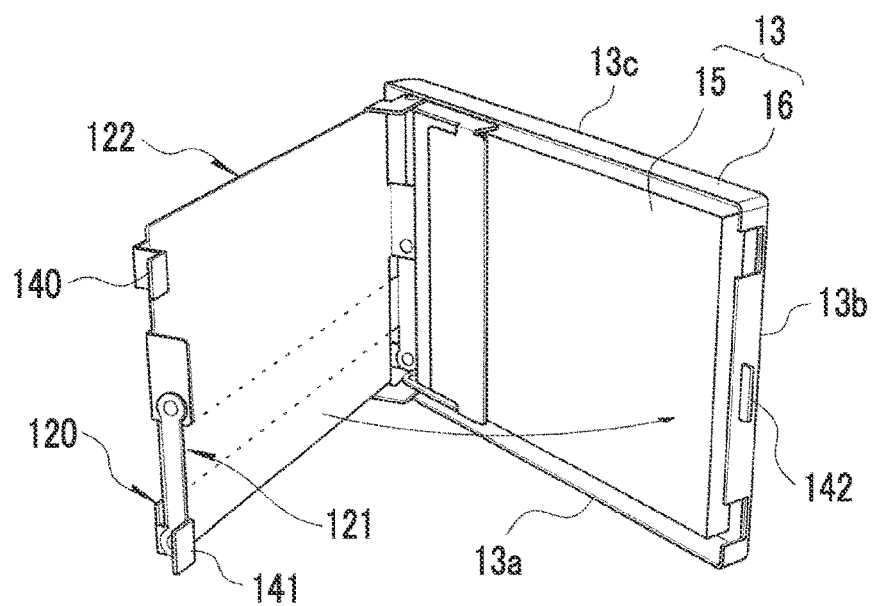
FIG. 24B is a schematic diagram illustrating an operation of the display of the imaging apparatus of FIG. 23.
Figure 24C:
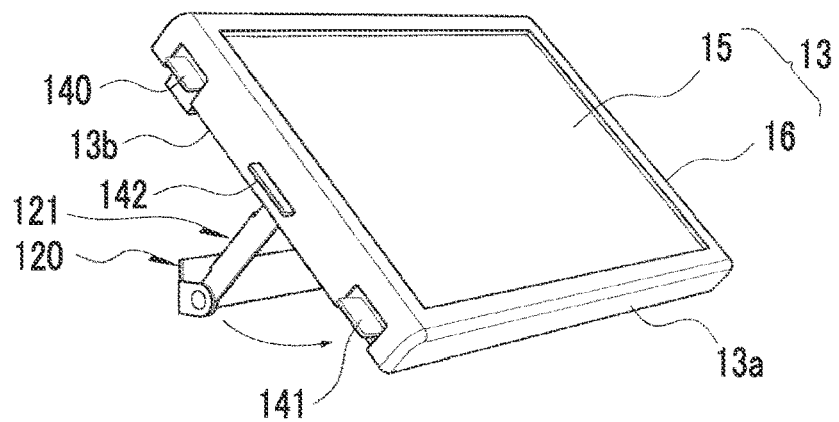
FIG. 24C is a schematic diagram illustrating an operation of the display of the imaging apparatus of FIG. 23.

FIGS. 22A and 22B show a case where the first hinge 123 and the second hinge 124 which are located closer to the axis B are disposed away from between the pair of third hinges 125 in the axial direction of the axis A, the axis A and the axis B intersect each other between the pair of first hinges 123, and the axis C and the axis B intersect each other between the pair of second hinges 124. In this case, the outer circumference of the cover 16 that covers the hinge unit 114 is equivalent to the outer circumference of the cover 16 shown in FIGS. 19A and 19B.

However, the first hinge 123 and the second hinge 124 which are located closer to the axis B are revolved about the axis B toward the bottom of the concave portion 17 of the main body 12 in association with the rotational movement of the display 13 about the axis B. The first hinge 123 and the second hinge 124 which are located closer to the axis B are disposed away from between the pair of third hinges 125 in the axial direction of the axis A and thus lead to an increase in revolution radius. For this reason, the bottom of the concave portion 17 of the main body 12 is required to have a clearance groove for avoiding interference with the first hinge 123 and the second hinge 124.

In this manner, one first hinge 123 of the pair of first hinges 123 which is located closer to the axis B and one second hinge 124 of the pair of second hinges 124 which is located closer to the axis B are disposed between the pair of third hinges 125, and thus it is possible to reduce the size of the hinge unit 114.

Meanwhile, a configuration has been described in which both the first hinge 123 and the second hinge 124 which are located closer to the axis B are disposed between the pair of third hinges 125, but in a case where at least one of the first hinge 123 or the second hinge 124 which is located closer to the axis B is disposed between the pair of third hinges 125, it is possible to reduce the size of hinge unit 114.

Next, description will be given of various modification examples of the digital camera 110 having an improvement in the rotational movement operability of the display 13 which is rotationally moved about the axis A integrally with the first support portion 121 and the second support portion 122 of the hinge unit 114, is rotationally moved about the axis C integrally with the second support portion 122, and is independently rotationally moved about the axis B.

In examples shown in FIG. 23, FIGS. 24A to 24C, a first rotational movement operating portion 140, a second rotational movement operating portion 141, and a third rotational movement operating portion 142 are included.

The first rotational movement operating portion 140 is provided to the second support portion 122 of the hinge unit 114, and is disposed away from the axis A on the long side 13c located opposite to the long side 13a of the display 13 along which the axis A extends and on the axis C biased toward the long side 13c with respect to the axis A, or is disposed closer to the long side 13c than the axis C. The first rotational movement operating portion 140 is provided in a state where a portion of the cover 16 of the display 13 that covers the hinge unit 114 is cut out and is exposed to the outer circumference of the display 13, and is constituted by a small piece-shaped protrusion capable of having a finger hooked thereon.

The second rotational movement operating portion 141 is also provided to the second support portion 122 of the hinge unit 114, and is disposed away from the axis C on the long side 13a of the display 13 along which the axis A extends. The second rotational movement operating portion 141 is provided in a state where a portion of the cover 16 of the display 13 that covers the hinge unit 114 is cut out and is exposed to the outer circumference of the display 13, and is constituted by a small piece-shaped protrusion capable of having a finger hooked thereon.

The third rotational movement operating portion 142 is provided to the display 13, and is disposed away from the axis B on the short side 13b located opposite to the short side 13d of the display 13 along which the axis B extends. The third rotational movement operating portion 142 is also constituted by a small piece-shaped protrusion capable of having a finger hooked thereon.

In a case where the first rotational movement operating portion 140 is lifted up, the second support portion 122 of the hinge unit 114 provided with the first rotational movement operating portion 140 is rotationally moved about the axis A integrally with the first support portion 121, the display 13 supported by the second support portion 122 is also rotationally moved about the axis A integrally with the first support portion 121 and the second support portion 122. In a case where the second rotational movement operating portion 141 is lifted up, the second support portion 122 of the hinge unit 114 provided with the second rotational movement operating portion 141 is rotationally moved about the axis C, and the display 13 supported by the second support portion 122 is also rotationally moved about the axis C integrally with the second support portion 122. In a case where the third rotational movement operating portion 142 is lifted up, the display 13 provided with the third rotational movement operating portion 142 is independently rotationally moved about the axis B. Thereby, the display 13 is prevented from being erroneously operated in its rotational movement about each of the axis A, the axis C and the axis B, and thus it is possible to improve the rotational movement operability of the display 13.

Figure 25:
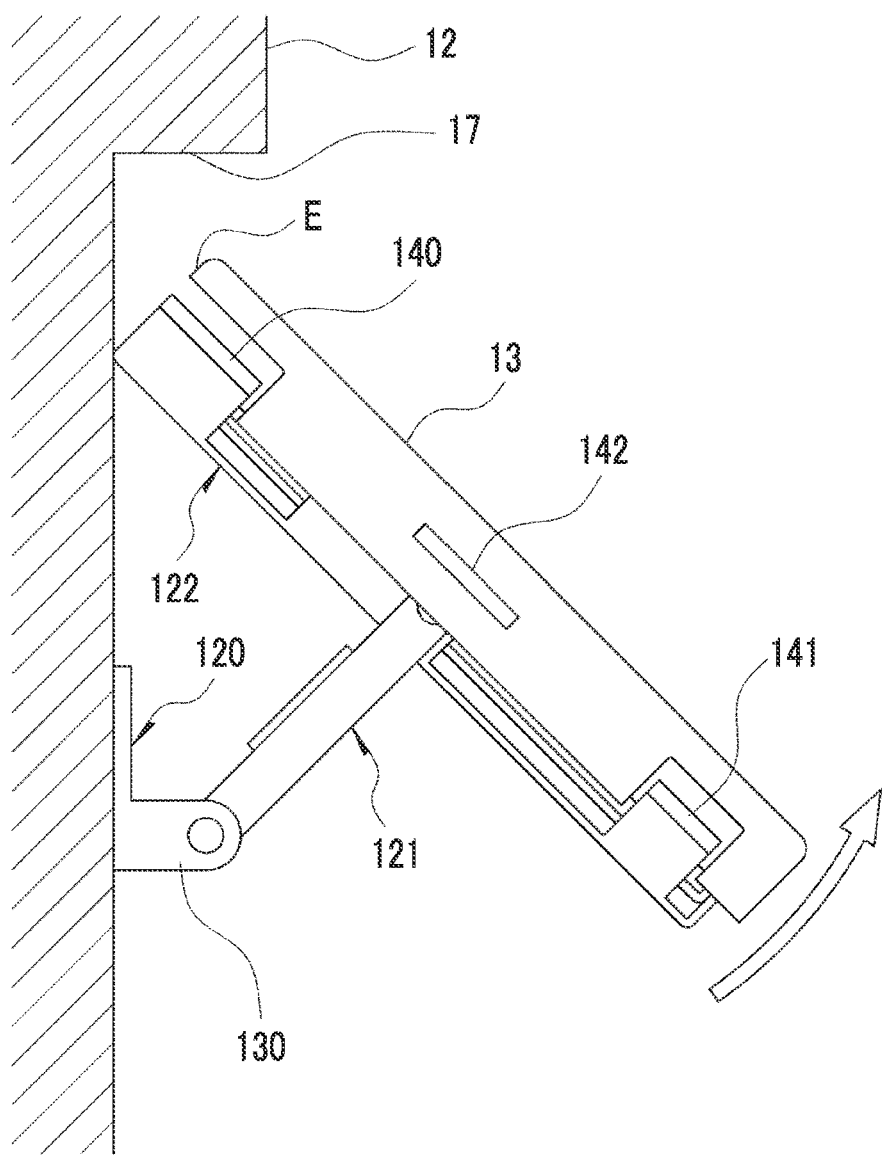
FIG. 25 is a side view of a display and a hinge unit which are modification examples of the imaging apparatus of FIG. 23.

Here, in the shown example in which the axis C biased toward the long side 13c located opposite to the long side 13a with respect to the axis A extending along the long side 13a of the display 13 is provided to be spaced from the long side 13c, the first rotational movement operating portion 140 is provided so as to be exposed to the lateral side of the long side 13c, preferably, as shown in FIG. 25. Insofar as being exposed to the lateral side of the long side 13c, the first rotational movement operating portion 140 may be provided so as to be exposed to the longitudinal central portion of the lateral side of the long side 13c, may be provided so as to be exposed to the longitudinal end of each lateral side of the long side 13c and the short side 13b at the corner between the long side 13c and the short side 13b, or may be provided so as to be exposed to the longitudinal end of each lateral side of the long side 13c and the short side 13b at the corner between the long side 13c and the short side 13d.

The first rotational movement operating portion 140 provided so as to be exposed to the lateral side of the long side 13c slidably moves on the bottom of the concave portion 17 of the main body 12 when the display 13 is rotationally moved about the axis C. Thereby, the edge E of the cover 16 constituting the lateral side of the long side 13c slidably moves on the bottom of the concave portion 17 of the main body 12, and thus it is possible to prevent the display from being rotationally moved about the axis B due to friction against the bottom of the concave portion 17, and to further prevent the display 13 from being erroneously operated.

Figure 26:
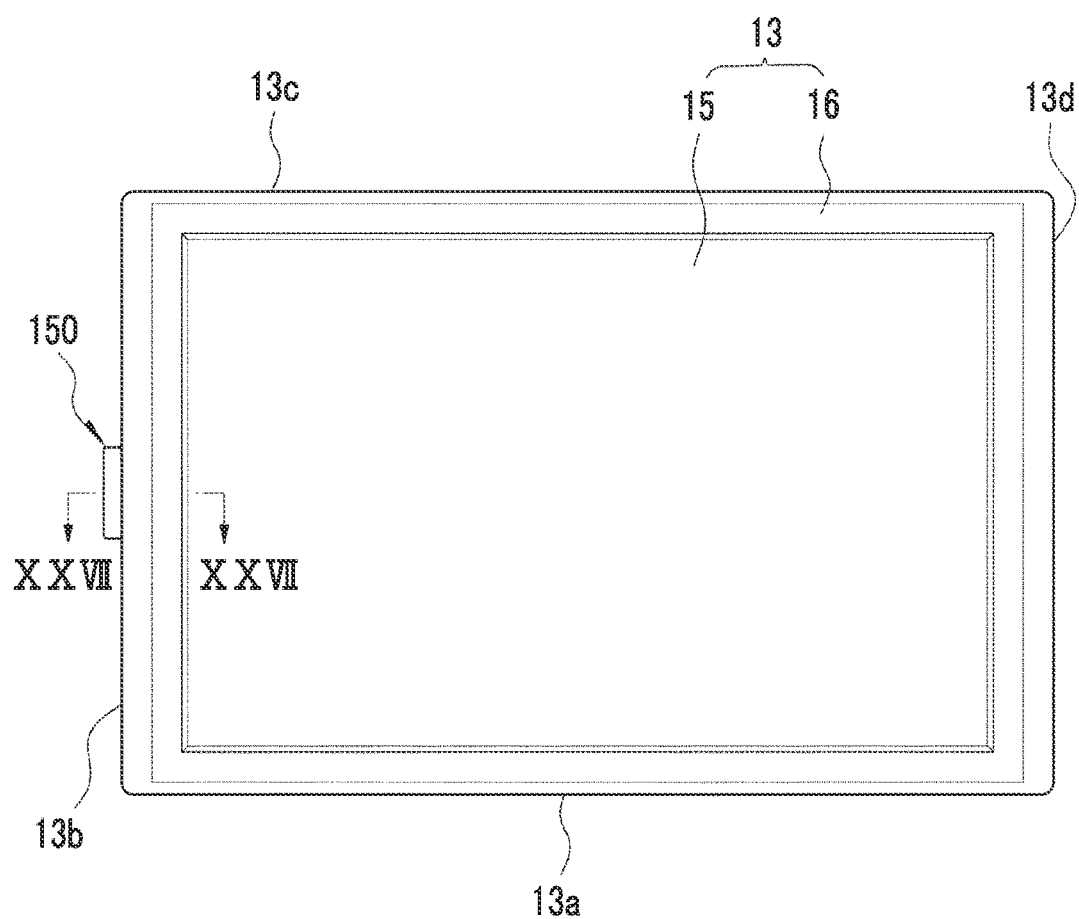
FIG. 26 is a front view of a display and a hinge unit which are other modification examples of the imaging apparatus of FIG. 17A.
Figure 27A:
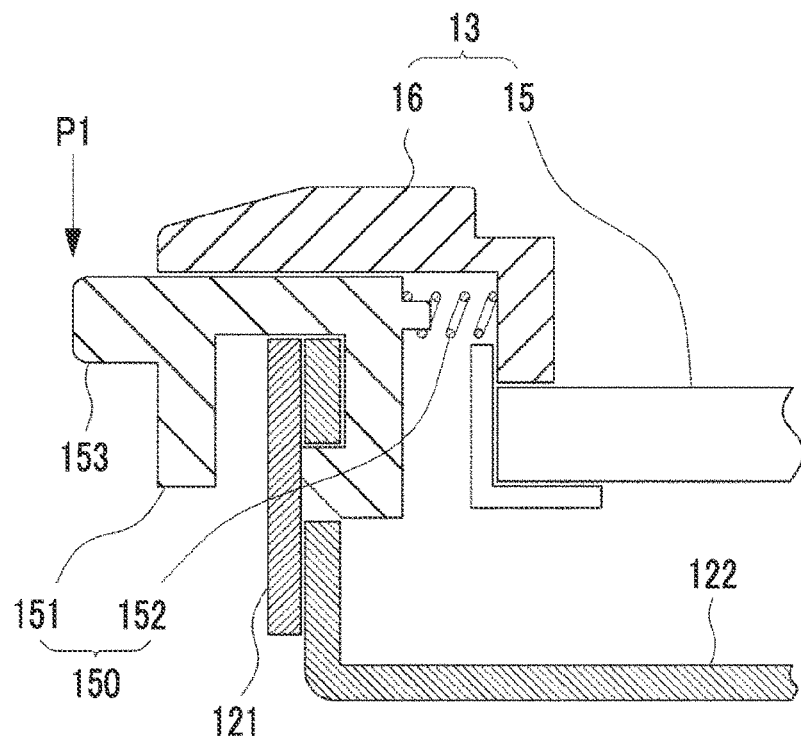
FIG. 27A is a cross-sectional view taken along line XXVII-XXVII in FIG. 26.
Figure 27B:
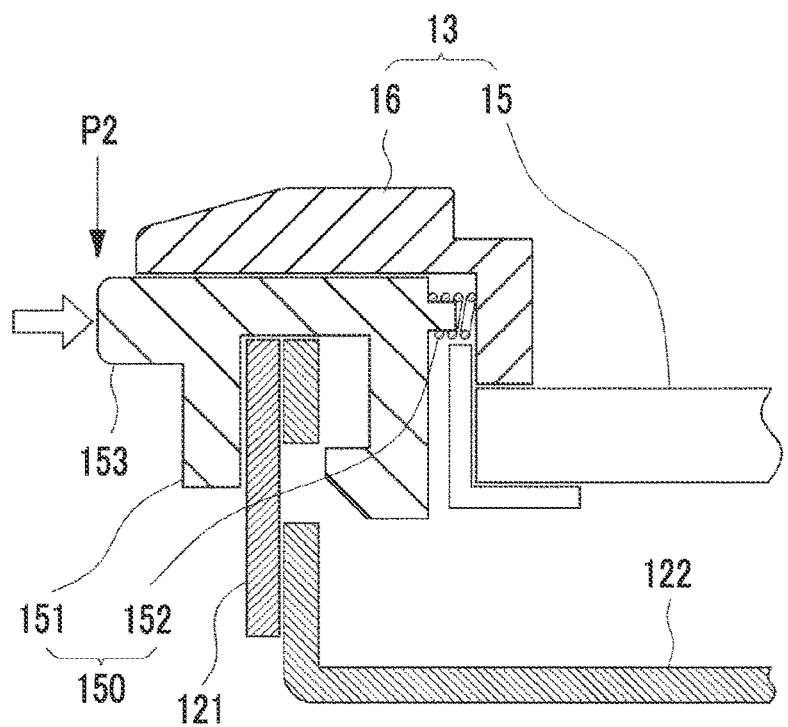
FIG. 27B is a cross-sectional view illustrating an operation of a rotational movement operating portion of FIG. 27A.

In the examples shown in FIGS. 23, and 24A to 24C, individual rotational movement operating portions are provided for the rotational movement of the display 13 about the axis A, the rotational movement of the display about the axis C, and the rotational movement of the display about the axis B, respectively, but examples shown in FIGS. 26, 27A and 27B show one rotational movement operating portion 150 which is simplified.

The rotational movement operating portion 150 is provided to the display 13, and is disposed away from the axis B on the short side 13b located opposite to the short side 13d of the display 13 along which the axis B extends.

The rotational movement operating portion 150 includes an engagement member 151 and a biasing member 152. The engagement member 151 is supported by the cover 16 of the display 13 so as to be movable between a locked position P1 engaged with the second support portion 122 of the hinge unit 114 and an unlocked position P2 released from the engagement with the second support portion 122. The direction of movement from the locked position P1 of the engagement member 51 the unlocked position P2 may be parallel to the axial directions of the axis A and the axis C, and may be parallel to the axial direction of the axis B, which has no particular limited thereon. The biasing member 152 biases the engagement member 151 toward the locked position P1.

The engagement member 151 is provided with a small piece-shaped protruding portion 153 which is exposed to the outer circumference of the display 13, and is capable of having a finger hooked thereon. By the operation of the protruding portion 153, the rotational movement operating portion 150 is lifted up, and the engagement member 151 is moved from the locked position P1 to the unlocked position P2.

In a case where the engagement member 151 is engaged with the second support portion 122 of the hinge unit 114 at the locked position P1, the display 13 is integrated with the second support portion 122. Since the second support portion 122 is not rotatable about the axis B with respect to the main body 12, the display 13 is rotatable only about the axis A and the axis C in a state where the engagement member 151 is engaged with the second support portion 122. The lateral side of one short side 13b of the display 13 is exposed by the concave portion 17 which is open to one lateral side of the main body 12. For example, in a state where a finger is hooked on the exposed lateral side of the short side 13b, the lateral side of the short side 13b is lifted up, and the display 13 is rotationally moved about the axis A or the axis C.

In a state where the engagement member 151 is moved to the unlocked position P2 and is released from engagement with the second support portion 122, the display 13 is also rotatable about the axis B. In a case where the rotational movement operating portion 150 is lifted up in this state, the display 13 provided with the rotational movement operating portion 150 is independently rotationally moved about the axis B. Thereby, the display 13 is prevented from being erroneously operated in its rotational movement about each of the axis A, the axis C and the axis B, and thus it is possible to improve the rotational movement operability of the display 13.

Figure 28:
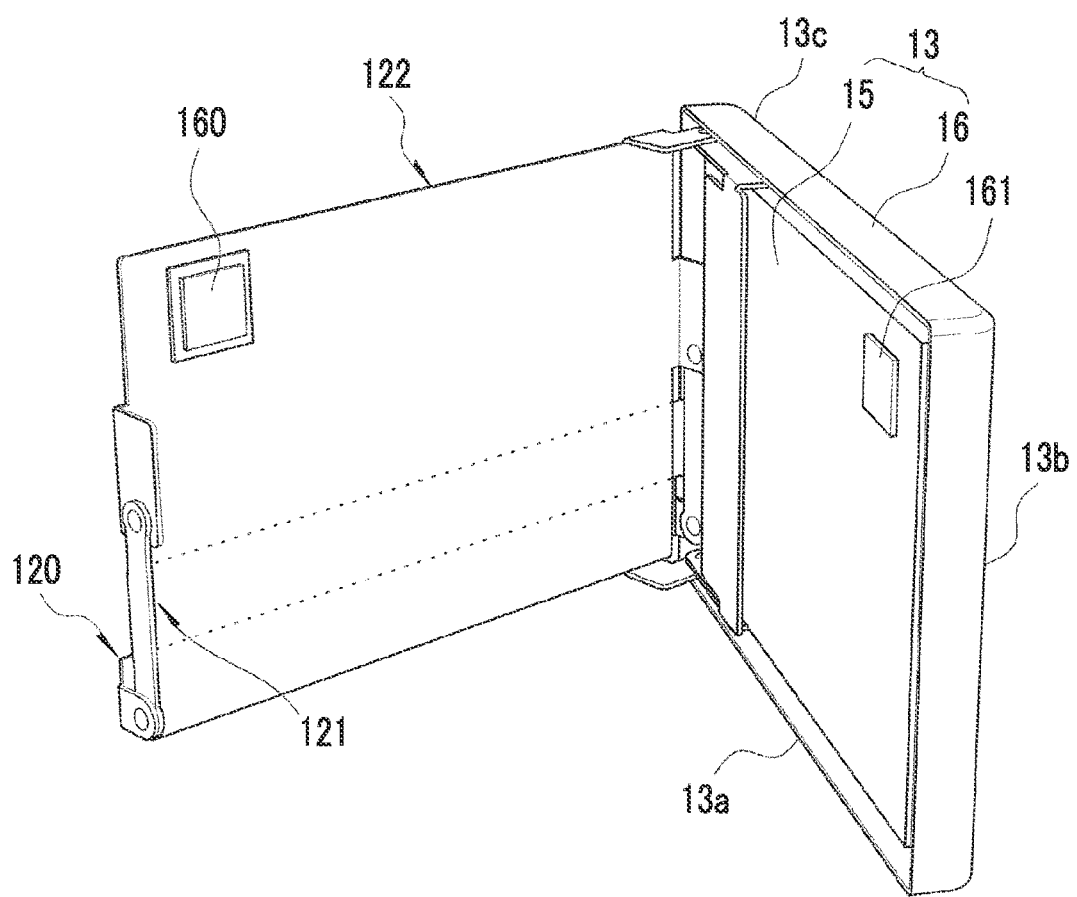
FIG. 28 is a perspective view of a display and a hinge unit which are other modification examples of the imaging apparatus of FIG. 17A.

In an example shown in FIG. 28, the initial torque of rotational movement of the display 13 about the axis B is made larger than the initial torque of rotational movement of the display 13 about the axis A and the initial torque of rotational movement of the display about the axis C.

In addition, the lateral side of one short side 13b of the display 13 is exposed by the concave portion 17 which is open to one lateral side of the main body 12. In the present example, in a state where a finger is hooked on the exposed lateral side of the short side 13b, the lateral side of the short side 13b is lifted up, and the display 13 is rotationally moved in the direction of separating from the rear surface of the main body 12.

The revolution radius of an operation region about the axis B on the lateral side of the short side 13b becomes longer than the revolution radius thereof about the axis A and the revolution radius thereof about the axis C. Consequently, the initial torque of rotational movement of the display 13 about the axis B is made relatively large, and thus an operation load during the rotational movement of the display 13 about the axis B can be made substantially equal to an operation load during the rotational movement of the display about the axis A, or can be made larger than an operation load during the rotational movement of the display about the axis A. Thereby, the display 13 is prevented from being carelessly rotationally moved about the axis B, and thus it is possible to improve the rotational movement operability of the display 13.

In the example shown in FIG. 28, a pair of magnets are included.

One magnet 160 is provided with the second support portion 122 of the hinge unit 114, and the other magnet 161 is provided with the display 13. The magnet 160 and the magnet 161 are disposed away from the axis B on the short side 13b located opposite to the short side 13d of the display 13 along which the axis B extends, and are disposed so that magnetic poles different from each other face each other.

The display 13 is absorptively fixed to the second support portion 122 due to an attractive force which is generated between the magnet 160 and the magnet 161. Since the magnet 160 and magnet 161 are disposed away from the axis B on the short side 13b located opposite to the short side 13d of the display 13 along which the axis B extends, the initial torque of rotational movement of the display 13 about the axis B is increased due to the attractive force between magnet 160 and the magnet 161. A torque about the axis B based on the attractive force between the magnet 160 and the magnet 161 is appropriately adjusted depending on surface magnetic flux density and facing interval between the magnet 160 and magnet 161, and a distance between the magnets 160 and 161 and the axis B, and the initial torque of rotational movement of the display 13 about the axis B is set to be larger than the initial torque of rotational movement of the display about the axis A and the initial torque of rotational movement of the display about the axis C.

Preferably, the magnet 160 and the magnet 161 are provided adjacent to the short side 13b located opposite to the short side 13d of the display 13 along which the axis B extends so that the attractive force between the magnet 160 and the magnet 161 effectively acts as a torque about the axis B.

Further, when the display 13 rotationally moved about the axis B in the direction of separating from the rear surface of the main body 12 is rotationally moved again in a direction along the rear surface of the main body 12, the attractive force between the magnet 160 and the magnet 161 also acts so as to attract the display 13 to the rear surface of the main body 12. The display 13 rotationally moved up to the vicinity of the rear surface of the main body 12 is attracted to the rear surface of the main body 12 due to the attractive force between the magnet 160 and the magnet 161, and is automatically disposed at a proper position along the rear surface of the main body 12. Thereby, it is possible to further improve the rotational movement operability of the display 13.

Meanwhile, as shown in the example shown in FIG. 13, when the main body 12 is also provided with a magnet, and the display 13 rotationally moved about the axis A or the axis C in the direction of separating from the rear surface of the main body 12 is rotationally moved again in a direction along the rear surface of the main body 12 due an attractive force which is generated between the magnet 160 provided to the second support portion 122 of the hinge unit 114 and the magnet of the main body 12, the display 13 may be attracted to the rear surface of the main body 12. In this case, from the viewpoint that the initial torque of rotational movement of the display 13 about the axis B is made relatively large, the attractive force between the magnet 160 and the magnet of the main body 12 is set to be smaller than the attractive force between the magnet 160 and the magnet 161.

In addition, in the digital camera 110, the first hinge 123, the second hinge 124 and the third hinge 125 are also each provided with a click mechanism shown in FIGS. 14A and 14B, and the initial torque of rotational movement of the display 13 about the axis B can be made relatively large using the click mechanism.

Figure 29:
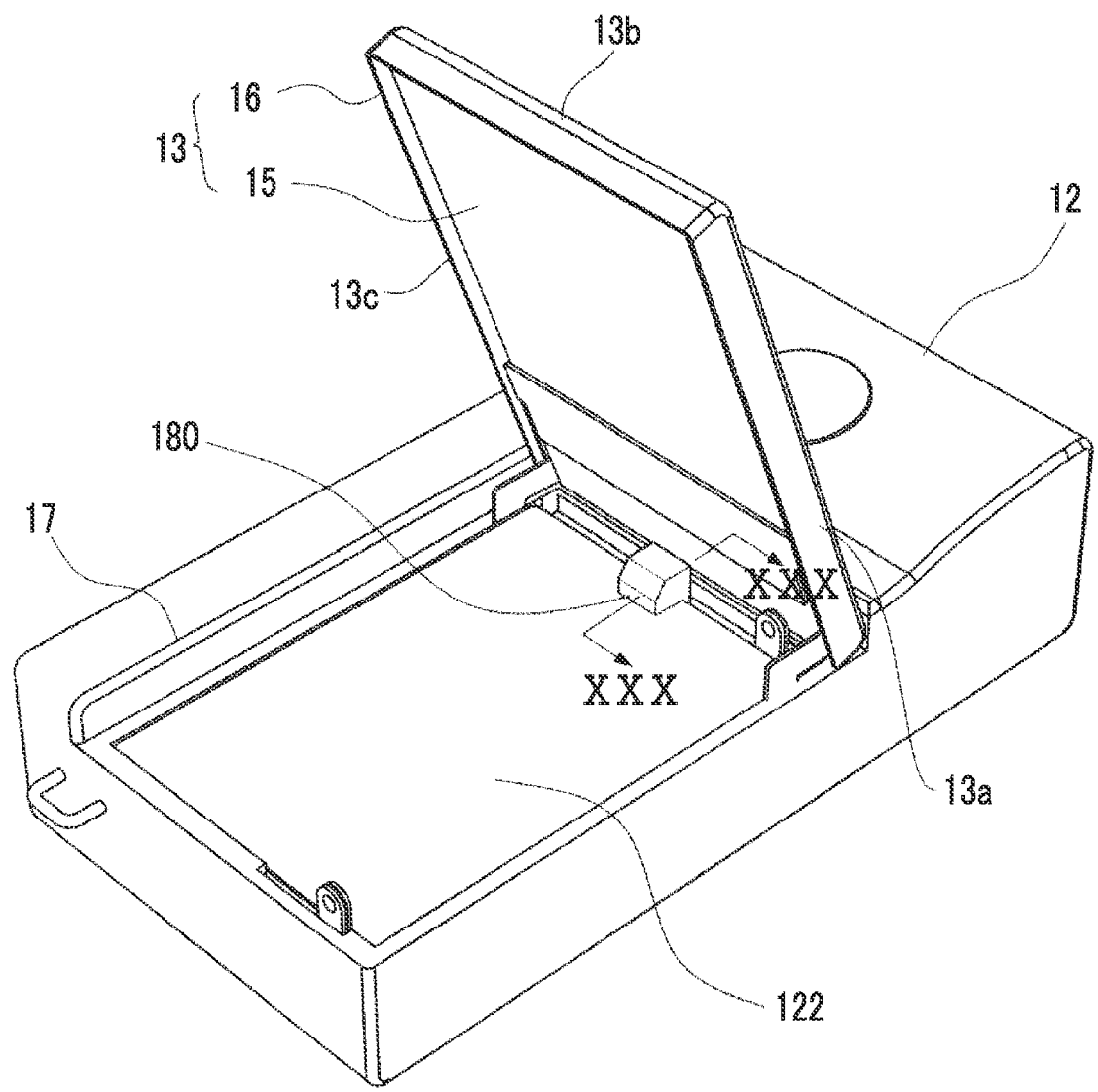
FIG. 29 is a perspective view of another modification example of the imaging apparatus of FIG. 17A.
Figure 30A:
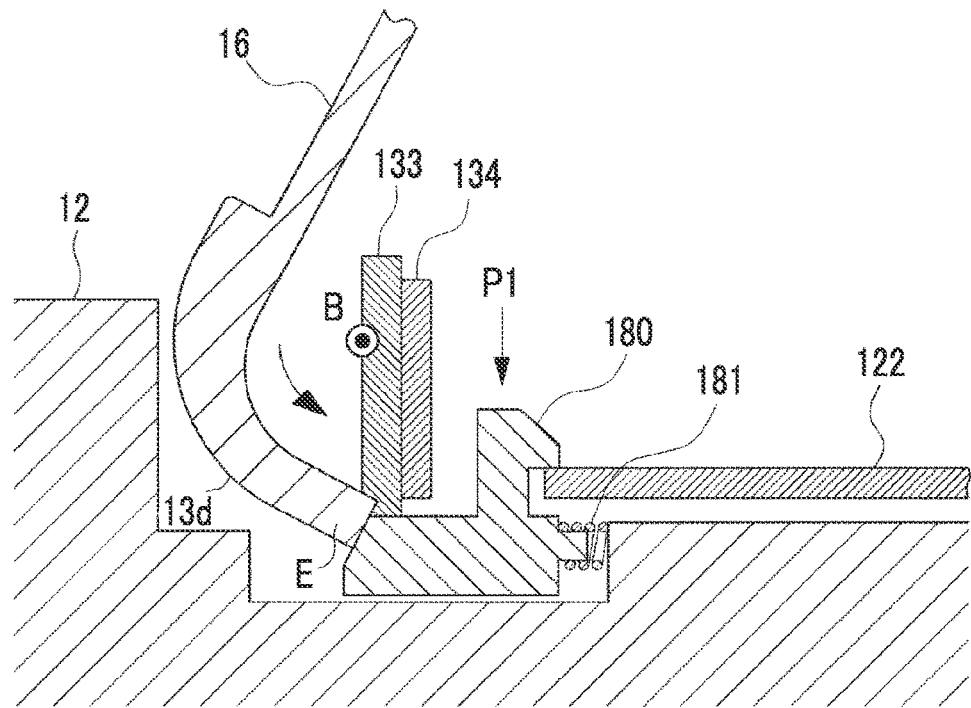
FIG. 30A is a cross-sectional view taken along line XXX-XXX in FIG. 29.
Figure 30B:
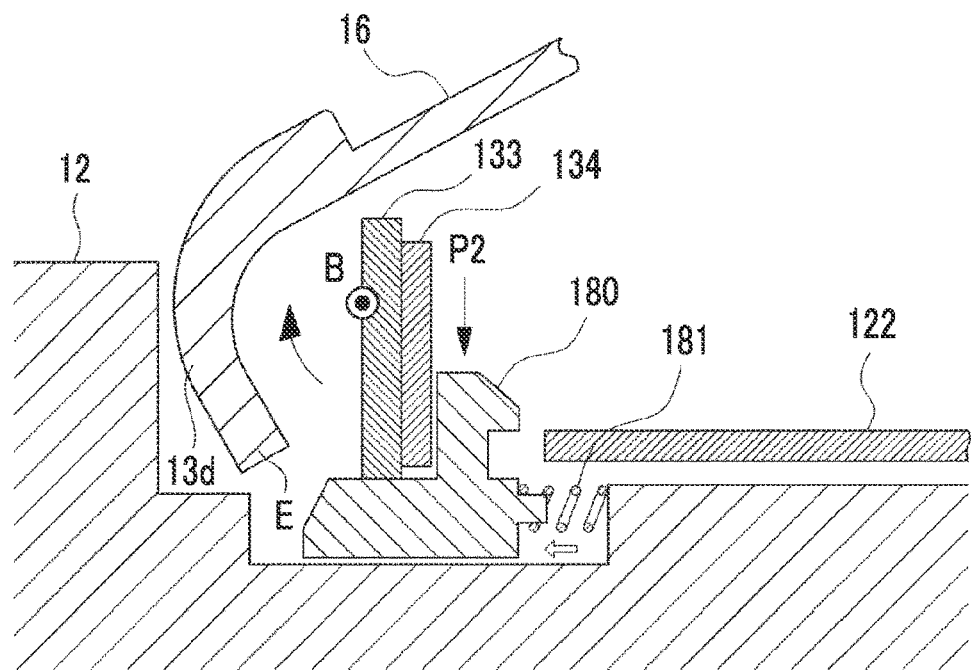
FIG. 30B is a cross-sectional view illustrating an operation of an engagement member of FIG. 30A.
Figure 31:
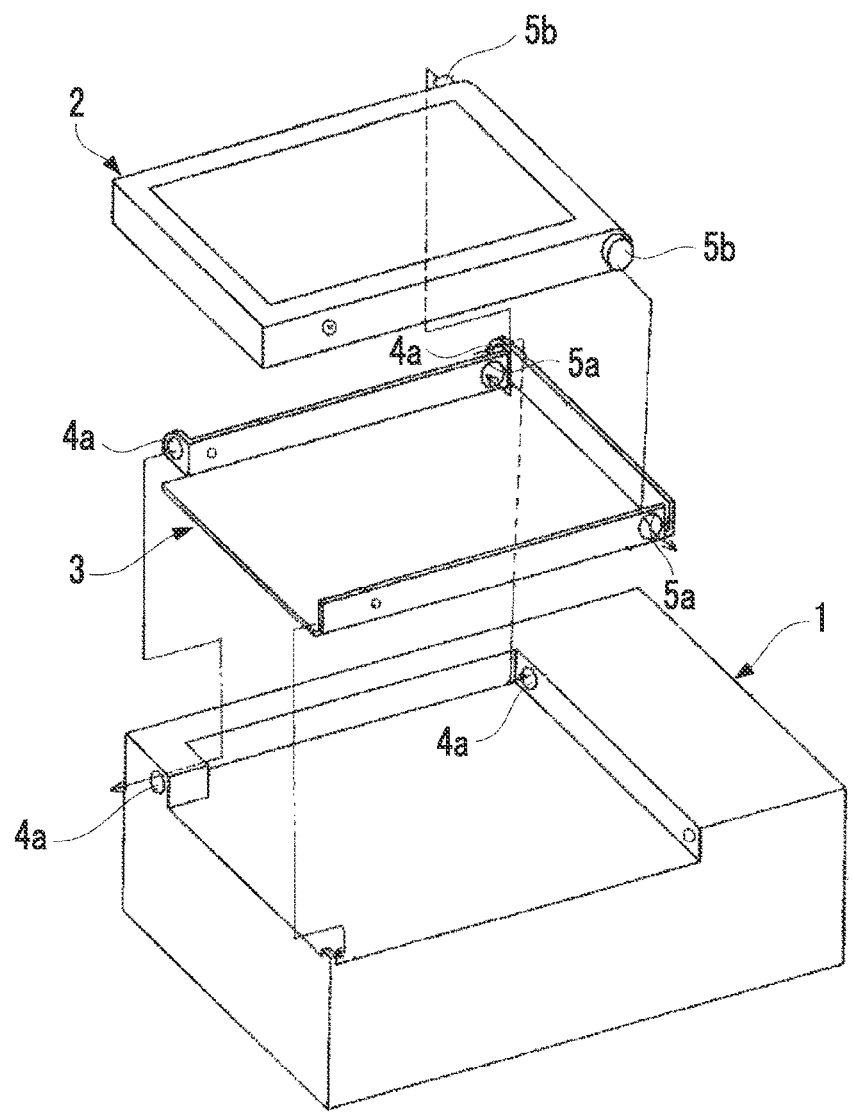
FIG. 31 is an exploded perspective view of an example of an imaging apparatus of the related art.
Figure 32A:
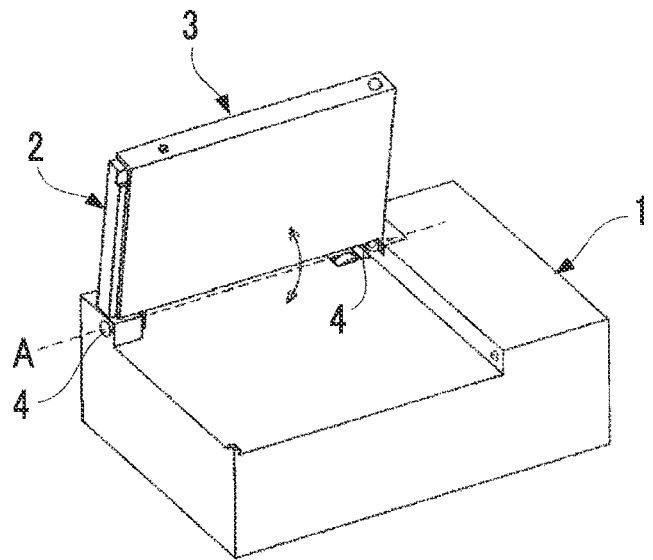
FIG. 32A is a schematic diagram illustrating an operation of the display of the imaging apparatus of FIG. 31.
Figure 32B:
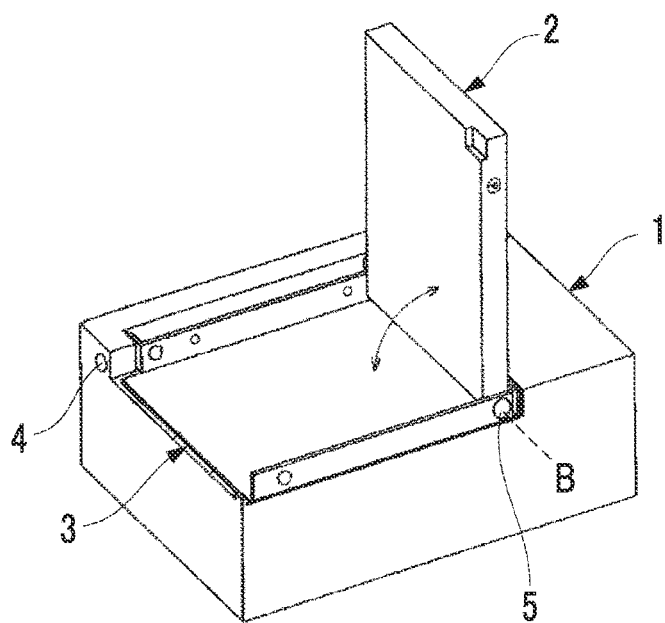
FIG. 32B is a schematic diagram illustrating an operation of the display of the imaging apparatus of FIG. 31.

In examples shown in FIGS. 29, 30A and 30B, the rotational movement of the display 13 about the axis A and the axis C is regulated in a state where the display 13 is rotationally moved about the axis B.

The concave portion 17 of the main body 12 having the display 13 received therein is provided with an engagement member 180 and a biasing member 181. The engagement member 180 is disposed on a revolution trajectory about the axis B of an edge E of the cover 16 constituting the lateral side of the short side 13d of the display 13 along which the axis B extends, and is pressed by the edge E of the cover 16 when the display 13 disposed along the rear surface of the main body 12 is rotationally moved about the axis B in the direction of separating from the rear surface of the main body 12.

The engagement member 180 is supported by the main body 12 so as to be movable in a pressing direction between the locked position P1 at which the second support portion 122 is fixed to the main body 12 by engagement with the second support portion 122 of the hinge unit 14 and the unlocked position P2 released from the engagement with the second support portion 122. The biasing member 181 biases the engagement member 180 toward the unlocked position P2.

In a state where the engagement member 180 is released from the engagement with the second support portion 122 of the hinge unit 114 at the unlocked position P2, the display 13 is rotatable about each of the axis A and the axis B. In a case where the display 13 is rotationally moved about the axis B in this state, the engagement member 180 is moved to the locked position P1 due to pressure by the edge E of the cover 16 of the display 13, and engages with the second support portion 122 of the hinge unit 14. The second support portion 122 is fixed to the main body 12 by the engagement of the engagement member 180 with the second support portion 122, the second support portion 122 is prevented from being rotationally moved about the axis A and the axis C, and the display 13 is also prevented from being rotationally moved about the axis A and the axis C.

In this manner, in a case where the display 13 is rotationally moved about the axis B, the unnecessary rotational movement of the display 13 is eliminated by preventing the display 13 from being rotationally moved about the axis A and the axis C, and thus it is possible to improve the rotational movement operability of the display 13.

As described above, according to the present specification, there is provided an imaging apparatus comprising: a main body having an imaging element; a rectangular display disposed along one surface of the main body; and a hinge unit that movably connects the display to the main body; wherein the hinge unit includes a support portion connected to the main body so as to be rotationally movable about a first axis by a pair of first hinges on the first axis extending along one of two sides of the display which are at right angles to each other, the display is supported by the support portion so as to be rotationally movable about a second axis by a pair of second hinges on the second axis extending along the other of the two sides of the display which are at right angles to each other, and one of the pair of first hinges is disposed between the pair of second hinges.

In addition, in the imaging apparatus disclosed in the present specification, the support portion includes a first rotational movement operating portion, which is disposed away from the first axis and at one side located opposite to one side of the display along which the first axis extends, and is provided so as to be exposed to an outer circumference of the display, and the display includes a second rotational movement operating portion disposed away from the second axis and at one side located opposite to one side of the display along which the second axis extends.

In addition, in the imaging apparatus disclosed in the present specification, the display includes a rotational movement operating portion disposed away from the second axis and at one side located opposite to one side of the display along which the second axis extends, and the rotational movement operating portion includes an engagement member movable between a locked position at which the display is prevented from being rotationally moved about the second axis by engagement with the support portion and an unlocked position which is released from the engagement with the support portion, and a biasing member that biases the engagement member toward the locked position.

In addition, in the imaging apparatus disclosed in the present specification, an initial torque of rotational movement of the display about the second axis is larger than an initial torque of rotational movement of the support portion about the first axis.

In addition, in the imaging apparatus disclosed in the present specification, the main body includes an engagement member movable between a locked position at which the support portion is fixed to the main body by engagement with the support portion and an unlocked position which is released from the engagement with the support portion, and a biasing member that biases the engagement member toward the unlocked position, and the engagement member is pressed by the display rotationally moved about the second axis in a direction of separating from one surface of the main body and is moved to the locked position.

In addition, according to the present specification, there is provided an imaging apparatus comprising: a main body having an imaging element; a rectangular display disposed along one surface of the main body; and a hinge unit that movably connects the display to the main body; wherein the hinge unit includes a first support portion connected to the main body so as to be rotationally movable about a first axis by a pair of first hinges on the first axis extending along one of two sides of the display which are at right angles to each other, and a second support portion connected to the first support portion so as to be rotationally movable about a second axis parallel to the first axis by a pair of second hinges on the second axis biased toward one side located opposite to one side of the display along which the first axis extends with respect to the first axis, the display is supported by the second support portion so as to be rotationally movable about a third axis by a pair of third hinges on the third axis extending along the other of two sides of the display which are at right angles to each other, and at least any one of one of the pair of first hinges and one of the pair of second hinges is disposed between the pair of third hinges.

In addition, in the imaging apparatus disclosed in the present specification, the second support portion includes a first rotational movement operating portion which is away from the first axis and at one side located opposite to one side of the display along which the first axis extends and is provided so as to be exposed to an outer circumference of the display, and a second rotational movement operating portion which is disposed away from the second axis and at one side of the display along which the first axis extends and is provided so as to be exposed to the outer circumference of the display, and the display includes a third rotational movement operating portion disposed away from the third axis and at one side located opposite to one side of the display along which the third axis extends.

In addition, in the imaging apparatus disclosed in the present specification, the first rotational movement operating portion is provided so as to be exposed to one side located opposite to one side of the display along which the first axis extends on an outer circumference of the display.

In addition, in the imaging apparatus disclosed in the present specification, the display includes a rotational movement operating portion disposed away from the third axis and at one side located opposite to one side of the display along which the third axis extends, and the rotational movement operating portion includes an engagement member movable between a locked position at which the display is prevented from being rotationally moved about the third axis by engagement with the second support portion and an unlocked position which is released from the engagement with the second support portion, and a biasing member that biases the engagement member toward the locked position.

In addition, in the imaging apparatus disclosed in the present specification, an initial torque of rotational movement of the display about the third axis is larger than an initial torque of rotational movement of the first support portion about the first axis and an initial torque of rotational movement of the second support portion about the second axis.

In addition, in the imaging apparatus disclosed in the present specification, the main body includes an engagement member movable between a locked position at which the second support portion is fixed to the main body by engagement with the second support portion and an unlocked position which is released from the engagement with the second support portion, and a biasing member that biases the engagement member toward the unlocked position, and the engagement member is pressed by the display rotationally moved about the third axis in a direction of separating from one surface of the main body and is moved to the locked position.

In addition, in the imaging apparatus disclosed in the present specification, the display includes a cover that covers the hinge unit.

The present invention can be used in various imaging apparatuses in which a display is movably connected to a main body.

Hereinbefore, although the embodiments of the present invention has been described, the embodiments are merely illustrative, and the present invention can be carried out in aspects in which various changes and modifications are added to the embodiments without departing from the spirit and scope of the present invention. This application claims priority from Japanese Application (JP2015-194236) filed on Sep. 30, 2015, the content of which is incorporated herein by reference in its entirety.

What is claimed is:
1. An imaging apparatus comprising:
a main body having an imaging element;
a rectangular display disposed along one surface of the main body; and
a hinge unit that movably connects the display to the main body;
wherein the hinge unit comprises a support member connected to the main body so as to be rotationally movable about a first axis by a pair of first hinges on the first axis extending in a direction in which one of two sides of the display extends, wherein the two sides are at right angles to each other,
the display is supported by the support member and is rotationally movable about a second axis by a pair of second hinges on the second axis extending in a direction in which the other of the two sides of the display extends, wherein the two sides are at right angles to each other, and
one of the pair of first hinges is disposed between the pair of second hinges.
2. The imaging apparatus according to claim 1,
wherein the support member comprises a first rotational movement operating portion, which is disposed away from the first axis and at one side located opposite to one side of the display which extends in the direction in which the first axis extends, and is provided so as to be exposed to an outer circumference of the display, and
the display comprises a second rotational movement operating portion disposed away from the second axis and at one side located opposite to one side of the display which extends in the direction in which the second axis extends.
3. The imaging apparatus according to claim 1,
wherein the display comprises a rotational movement operating portion disposed away from the second axis and at one side located opposite to one side of the display which extends in the direction in which the second axis extends, and
the rotational movement operating portion comprises an engagement member movable between a locked position at which the display is prevented from being rotationally moved about the second axis by engagement with the support member and an unlocked position which is released from the engagement with the support member, and a biasing member that biases the engagement member toward the locked position.

4. The imaging apparatus according to claim 1,
wherein an initial torque of rotational movement of the display about the second axis is larger than an initial torque of rotational movement of the support member about the first axis.

5. The imaging apparatus according to claim 1,
wherein the main body comprises an engagement member movable between a locked position at which the support member is fixed to the main body by engagement with the support member and an unlocked position which is released from the engagement with the support member, and a biasing member that biases the engagement member toward the unlocked position, and
the engagement member is pressed by the display rotationally moved about the second axis in a direction of separating from one surface of the main body and is moved to the locked position.

6. An imaging apparatus comprising:
a main body having an imaging element;
a rectangular display disposed along one surface of the main body; and
a hinge unit that movably connects the display to the main body;
wherein the hinge unit comprises
a first support member connected to the main body so as to be rotationally movable about a first axis by a pair of first hinges on the first axis extending in a direction in which one of two sides of the display extends, wherein the two sides are at right angles to each other, and
a second support member which is connected to the first support member and is rotationally movable about a second axis parallel to the first axis by a pair of second hinges on the second axis located in a biased manner at an opposite side to a side at which the first axis is located with respect to a center of the one surface,
the display is supported by the second support member and is rotationally movable about a third axis by a pair of third hinges on the third axis extending in a direction in which the other of the two sides of the display extends, wherein the two sides are at right angles to each other, and
at least any one of one of the pair of first hinges and one of the pair of second hinges is disposed between the pair of third hinges.

7. The imaging apparatus according to claim 6,
wherein the second support member comprises a first rotational movement operating portion which is away from the first axis and at one side located opposite to one side of the display which extends in the direction in which the first axis extends and is provided so as to be exposed to an outer circumference of the display, and a second rotational movement operating portion which is disposed away from the second axis and at one side of the display which extends in the direction in which the first axis extends and is provided so as to be exposed to the outer circumference of the display, and
the display comprises a third rotational movement operating portion disposed away from the third axis and at one side located opposite to one side of the display which extends in the direction in which the third axis extends.

8. The imaging apparatus according to claim 7,
wherein the first rotational movement operating portion is provided so as to be exposed to one side located opposite to one side of the display which extends in the direction in which the first axis extends on an outer circumference of the display.

9. The imaging apparatus according to claim 6,
wherein the display comprises a rotational movement operating portion disposed away from the third axis and at one side located opposite to one side of the display which extends in the direction in which the third axis extends, and
the rotational movement operating portion comprises an engagement member movable between a locked position at which the display is prevented from being rotationally moved about the third axis by engagement with the second support member and an unlocked position which is released from the engagement with the second support member, and a biasing member that biases the engagement member toward the locked position.

10. The imaging apparatus according to claim 6,
wherein an initial torque of rotational movement of the display about the third axis is larger than an initial torque of rotational movement of the first support member about the first axis and an initial torque of rotational movement of the second support member about the second axis.

11. The imaging apparatus according to claim 6,
wherein the main body comprises an engagement member movable between a locked position at which the second support member is fixed to the main body by engagement with the second support member and an unlocked position which is released from the engagement with the second support member, and a biasing member that biases the engagement member toward the unlocked position, and
the engagement member is pressed by the display rotationally moved about the third axis in a direction of separating from one surface of the main body and is moved to the locked position.

12. The imaging apparatus according to claim 1,
wherein the display comprises a cover that covers the hinge unit.

13. The imaging apparatus according to claim 2,
wherein the display comprises a cover that covers the hinge unit.

14. The imaging apparatus according to claim 3,
wherein the display comprises a cover that covers the hinge unit.

15. The imaging apparatus according to claim 4,
wherein the display comprises a cover that covers the hinge unit.

16. The imaging apparatus according to claim 5,
wherein the display comprises a cover that covers the hinge unit.

17. The imaging apparatus according to claim 6,
wherein the display comprises a cover that covers the hinge unit.

18. The imaging apparatus according to claim 7,
wherein the display comprises a cover that covers the hinge unit.

19. The imaging apparatus according to claim 8,
wherein the display comprises a cover that covers the hinge unit.

20. The imaging apparatus according to claim 1, wherein, when the display and the support member are positioned along the one surface of the main body, a virtual straight line which interconnects the pair of first hinges and a virtual straight line which interconnects the pair of second hinges intersect with each other in a planar view from a direction perpendicular to the one surface of the main body.

* * * * *